(12) United States Patent
Petermann

(10) Patent No.: US 12,526,718 B2
(45) Date of Patent: Jan. 13, 2026

(54) TECHNIQUES FOR STEERING COMMUNICATION TRAFFIC OF A USER EQUIPMENT IN A WIRELESS COMMUNICATION NETWORK

(71) Applicant: DEUTSCHE TELEKOM AG, Bonn (DE)

(72) Inventor: Dieter Petermann, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 84 days.

(21) Appl. No.: 18/553,855

(22) PCT Filed: Apr. 14, 2022

(86) PCT No.: PCT/EP2022/060104
§ 371 (c)(1),
(2) Date: Oct. 4, 2023

(87) PCT Pub. No.: WO2022/219151
PCT Pub. Date: Oct. 20, 2022

(65) Prior Publication Data
US 2024/0187957 A1   Jun. 6, 2024

(30) Foreign Application Priority Data
Apr. 16, 2021   (EP) .................................. 21168983

(51) Int. Cl.
*H04W 36/36* (2009.01)
*H04W 28/02* (2009.01)
(52) U.S. Cl.
CPC ..... *H04W 36/362* (2023.05); *H04W 28/0231* (2013.01)
(58) Field of Classification Search
CPC . H04W 72/12; H04W 52/343; H04W 52/242; H04W 52/243; H04W 52/367;
(Continued)

(56) References Cited

U.S. PATENT DOCUMENTS

| | | |
|---|---|---|
| 2020/0065694 A1 | 2/2020 | Mohapatra et al. |
| 2020/0351725 A1 | 11/2020 | Kim et al. |
| 2021/0084528 A1 | 3/2021 | Kim et al. |

FOREIGN PATENT DOCUMENTS

WO   WO-2019187302 A1 * 10/2019 ........... H04L 47/824

OTHER PUBLICATIONS

Ericsson, "Mobility Settings Change procedure for NG RAN", Feb. 24-Mar. 6, 2020 E-Meeting, vol. RAN WG3, No. E-Meeting Feb. 24, 2020-Mar. 6, 2020, par. 1, 2.1, 2.2, 2.3, 3 and 4, BNSDOCID: XP51854319A, 3GPP Draft; R3-200955, 3$^{rd}$ Generation Partnership Project (3GPP), Mobile Competence Centre, Sophia-Antipolis Cedex—France.

* cited by examiner

*Primary Examiner* — Charles N Appiah
*Assistant Examiner* — Frank E Donado
(74) *Attorney, Agent, or Firm* — LEYDIG, VOIT & MAYER, LTD.

(57) ABSTRACT

A method for steering communication traffic of a user equipment (UE) in a network includes network entities that are configured to provide a radio access network for the user equipment. A serving network entity provides a current access to the network for the UE. Each network entity communicates with neighboring network entities. An algorithm implemented on a network unit uses as input a first time duration (Tcell), when the UE is within a radio coverage of the serving network entity, and a second time duration (TLC) that is time taken by the network to determine an adjusted load control setting. If Tcell>TLC the algorithm applies load control procedures within the communication network, and transmits a Radio Resource Control message with a network-calculated load control information to the UE. Otherwise, the algorithm transmits a Radio Resource (Continued)

Control message without the network-calculated load control information to the UE.

14 Claims, 22 Drawing Sheets

(58) Field of Classification Search
CPC . H04W 52/54; H04W 72/0446; H04W 16/06; H04W 28/08; H04W 36/22; H04W 28/16; H04W 28/0983; H04W 28/0992; H04W 28/0975; H04W 28/0967; H04W 28/0958; H04W 28/095; H04W 28/0942; H04W 28/0933; H04W 28/0867; H04W 28/0875; H04W 28/0883; H04W 28/0892; H04W 28/09; H04W 28/0908; H04W 28/0917; H04W 28/0925; H04W 28/0812; H04W 28/0815; H04W 28/0819; H04W 28/0823; H04W 28/0827; H04W 28/0831; H04W 28/0835; H04W 28/0838; H04W 28/0842; H04W 28/0846; H04W 28/0858; H04W 24/00; H04W 28/0804; H04W 28/0808; H04J 11/005

See application file for complete search history.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1..4095,...) | Allocated by NG-RAN node1 | YES | reject |
| NG-RAN node2 Measurement ID | M | | INTEGER (1..4095,...) | Allocated by NG-RAN node2 | YES | reject |
| Cell Measurement Result | | 1 | | | YES | ignore |
| >Cell Measurement Result Item | | 1..< maxnoofCellsinN G-RANnode > | | | YES | ignore |
| >>Cell ID | M | | Global NG-RAN Cell Identity 9.2.2.27 | | | |
| >>Radio Resource Status | O | | 9.2.2.50 | | -- | |
| >>TNL Capacity Indicator | O | | 9.2.2.49 | | -- | |
| >>Composite Available Capacity Group | O | | 9.2.2.51 | | -- | |
| >>Slice Available Capacity | O | | 9.2.2.55 | | -- | |
| >>Number of Active UEs | O | | 9.2.2.62 | | -- | |
| >> RRC Connections | O | | 9.2.2.56 | | -- | |

FIG. 12

| IE/Group Name | Presence | Range | IE type and reference | Semantics description |
|---|---|---|---|---|
| DL TNL Offered Capacity | M | | INTEGER (1..16777216,...) | Maximum capacity offered by the transport portion of the cell in kbps |
| DL TNL Available Capacity | M | | INTEGER (0..100,...) | Available capacity over the transport portion serving the cell in percentage. Value 100 corresponds to the offered capacity. |
| UL TNL Offered Capacity | M | | INTEGER (1..16777216,...) | Maximum capacity offered by the transport portion of the cell in kbps |
| UL TNL Available Capacity | M | | INTEGER (0..100,...) | Available capacity over the transport portion serving the cell in percentage. Value 100 corresponds to the offered capacity. |

FIG. 13

| IE/Group Name | Presence | Range | IE type and reference | Semantics description |
|---|---|---|---|---|
| Composite Available Capacity Downlink | M | | Composite Available Capacity | For the Downlink |
| Composite Available Capacity Uplink | M | | Composite Available Capacity | For the Uplink |

FIG. 14

| IE/Group Name | Presence | Range | IE type and reference | Semantics description |
|---|---|---|---|---|
| Cell Capacity Class Value | O | | 9.2.2.53 | |
| Capacity Value | M | | 9.2.2.54 | Value 0 indicates no available capacity, and 100 indicates maximum available capacity with respect to the whole cell. Capacity Value should be measured on a linear scale. |

FIG. 15

TECHNIQUES FOR STEERING COMMUNICATION TRAFFIC OF A USER EQUIPMENT IN A WIRELESS COMMUNICATION NETWORK

CROSS REFERENCE TO RELATED APPLICATIONS

This application is a U.S. National Phase application under 35 U.S.C. § 371 of International Application No. PCT/EP2022/060104, filed on Apr. 14, 2022, and claims benefit to European Patent Application No. EP 21168983.1, filed on Apr. 16, 2021. The International Application was published in English on Oct. 20, 2022 as WO 2022/219151 A1 under PCT Article 21(2).

FIELD

The invention relates to a method, communication network, a network entity and a user equipment that communicate with each other in the communication network. In particular, the invention relates to a method, a communication network, a network entity and a user equipment that are configured to robustly steer the communication of the user equipment in a way that the radio link failure is prevented during the handover process.

BACKGROUND

General information about the underlying system architecture of the technical field related to the invention can be found in reference [1].

Mobile protocols that us so called Uu- and NG-interfaces are divided into two structures:

User plane protocols: These are the protocols implementing the actual PDU Session service, i.e. carrying user data through the access stratum.

Control plane protocols: These are the protocols for controlling the PDU Sessions and the connection between the UE and the network from different aspects (including requesting of service, controlling different transmission resources, handover etc.). A mechanism for transparent transfer of NAS messages can be included, too.

User Plane: The PDU Session Resource service is offered from SAP to SAP by the Access Stratum. FIG. 1 shows the protocols on the Uu- and the NG-interfaces that are linked together to provide the PDU Session Resource service.

Control plane: FIG. 2 shows the control plane (signaling) protocol stacks on NG- and Uu-interfaces.

FIG. 3 shows the general architecture of NG-RAN: The NG-RAN (next generation-radio access network) consists of a set of gNBs (5g Base stations) connected to the 5GC (5G Core Network) through the NG interface. gNBs can be interconnected through a Xn interface. A gNB may consist of a gNB-CU and one or more gNB-DU(s). A gNB-CU and a gNB-DU is connected via a F1 interface.

FIG. 4 shows the overall architecture of NG-RAN and 5G Core network: The gNB is responsible for all radio-related functions in one or several cells, for example, radio resource management, admission control, connection establishment, routing of User Plane data to the UPF (User Plane Function) (see reference [2]) and Control Plane information to AMF (Access Mobility Function) (see reference [2]), and QoS (Quality of Service) flow management. As can be seen in FIG. 4, the gNB is connected to the 5G Core by means of the NG interface, more specifically to the UPF by means of NG user-plane part (NG-u), and to the AMF by means of the NG control-plane part (NG-c). One gNB can be connected to multiple UPFs/AMFs for the purpose of load sharing and redundancy. The Xn interface, connecting gNBs to each other, is mainly used to support active-mode mobility. This interface may be also used for multicell Radio Resource Management (RRM) functions. The Xn interface is also used to support lossless mobility between neighboring base stations by means of packet forwarding.

FIG. 5 illustrates a Handover process of a User Equipment (UE) from a serving gNB (i.e. the current base station) to another gNB. In general, the Handover process is a procedure for mobility steering in connected mode of UEs. The principle of handover is illustrated in the FIG. 5: In a first step, the network has to perform measurements and to apply corresponding configurations. After an Event 1 (usually that the radio quality measured in the UE is lower than a configured threshold) has occurred, the device sends Measurement Report to the Serving gNB. Now the Serving gNB has to negotiate with a neighboring gNB if this gNB is ready to serve the device ("Handover Request" and "Handover Request Acknowledge" messages). After neighboring gNB has accepted the device, the Serving gNB sends "RRC Reconfiguration message" to the device. The "RRC Reconfiguration message" contains the configuration which should be applied by the neighboring gNB. In the next steps, the device synchronizes to neighboring Node B and sends the message "RRC Reconfiguration Complete" to inform it that the handover has been performed.

Conditional Handover (CHO): Further explanations about CHO can be found in reference [3]. Mobility in connected mode—which is when a mobile terminal/user equipment is active—is controlled by network units, assisted by the mobile terminal and it is usually facilitated by the handover procedure as explained above. The mobile terminal transmits measurement reports if the communication link to the serving cell is getting degraded and/or the communication link of another neighboring cell is getting better than the one of the serving cell. Based on these measurement reports, the network units can hand over the mobile terminal connection from the serving cell to that neighbor cell, so that mobile terminal will have better radio conditions and consequently a better user experience. However, it can happen that, when the radio link gets degraded and the mobile terminal needs to send measurement reports, the uplink link is also degraded and that the reports never reach the network units. Or, even if they do, the network tries to respond with a handover command that may never reach the mobile terminal (either because the downlink—is degraded and/or the handover command is so large that it may require multiple transmissions). The following FIG. 6 depicts these two cases. If the radio link gets unacceptably worse, Radio Link Failure (RLF) is declared inside the UE and Reestablishment is initiated. RLF and Reestablishment is specified in reference [5].

These shortcomings can be solved be the CHO procedure. The conditional handover feature is standardized in 3GPP Rel-16 and basically works like this: The mobile terminal receives a handover command and stores it in its memory (an RRC Reconfiguration message prepared by a target candidate), without applying it instantly as it would have done in legacy handover/normal handover process. Together with the command, the mobile terminal also receives an associated condition to be monitored. When the condition is fulfilled, the mobile terminal applies the previously stored handover command, as if the network would have just sent it, instead of first sending a measurement report (that could fail to be transmitted) and then waiting to receive the command (which may fail to be received).

The condition that defines the criteria to apply the stored handover command is based on the quality of the serving cell(s) and neighboring cells, somewhat similar to the condition that in previous releases leads the mobile terminal to transmit a measurement report when the condition is fulfilled. For example, the network can configure the wireless terminal to transmit a measurement report when a neighbor cell becomes an "offset" better than the serving cell (Event 1 in FIG. 5, in reference [5] mentioned as A3), as a way to indicate to the network that a handover may be needed. In conditional handover, a similar condition can be configured, except that instead of transmitting the measurement report, the mobile terminal applies the stored handover command. Sending the handover command when the radio conditions are still favorable reduces the risk of failing the transmission of the measurement report and/or the reception of the handover command.

The principle of Conditional Handover is shown in the FIG. 7: The conditional handover features two phases: conditional handover preparation phase (phase 1) and conditional handover execution phase (phase 2). In the first phase, after Event 1 has occurred, the device submits Measurement Report to the network (Serving gNB), which reacts by reserving potential candidate cells (Neighbor gNB1 and Neighbor gNB2) for handover. The latter is done by messages 3 and 4. Once the candidate cells have been reserved, serving gNB proceeds with informing the UE about the candidate cells (message 5) and the device confirms this configuration (message 6).

In Phase 2, after Event 2 has occurred, the device synchronizes itself and sends the message HO Complete to the selected neighbor gNB (messages 7 and 8). Within the network, messages 9 and 10 are used to release the remaining candidate gNBs that were not suitable for handover process. In practice, different standardized events can be used for Event 2, e.g. A3 (a neighbor cell gets better than the serving cell by an offset) or A5 (the serving cell gets worse than threshold 1 and a neighbor cell gets better than threshold2) as specified in [5].

Load Balancing: The description of load balancing in this section is based on reference [4]. Load Balancing optimizes network capacity and user experience via an efficient utilization of the whole pool of available resources. Load Balancing directs the traffic to the best layer in overlaid cells by coordinating mobility configurations. Yet it should not compromise robust and optimized mobility performance in terms of e.g. timely and flawless execution of handovers. Load Balancing in connected mode, that is, Load Balancing integrated into handover procedure for overlapping cells is a focus of this invention.

Typically, the serving gNB manages load balancing with respect to all assigned (served) UEs. Hence, the serving gNB collects in a first step load information from the neighboring cell. This collection of load information is performed by using the "Global Xn Procedure Resource Status Reporting Initiation" and "Global Xn Procedure Resource Status Reporting" as described in reference [6]. Based on collected load information, the serving base station/gNB may control mobility decision criteria so that less loaded cells are favored as next serving cells. In simple words: The serving gNB tells the UE to which candidate gNB it shall connect next during the handover process. As reported radio channel measurements are used as a decision criterion for triggering the handover process, the serving gNB may negotiate e.g. a negative measurement offset with more loaded neighbor Node B so that less loaded neighbor Node B with overlapping coverage is favored for the handover procedure. This can be done by "Global Xn Procedure Mobility Settings Change" as described in reference [6]. Load balancing can be integrated in both ordinary handover procedure and conditional handover procedure.

The principle of load balancing in connected mode for two overlapping neighbor cells combined with ordinary handover process is depicted in the FIG. 8. The "Measurement Configuration message" can also contain negative offset negotiated for neighboring gNB2.

Request and Retrieval of Self Organized Network (SON) Measurements: Some of the measurements, which are used in the UE to implement the invention are so called SON measurements. These measurements are logged inside the UE and can be requested by the network in the message "UE Information Request" and are then reported to the network in the message "UE Information Response" as described in reference [5]. FIG. 9 shows the according information exchange between a network entity and a UE.

Capability Retrieval: UE capabilities are used to describe what technical features are implemented in the UE. If it is signaled to the network that a capability is supported, the network understands that the related technical feature is implemented in the UE and can use this knowledge in the subsequent device configurations. The network requests UE capability by "UE Capability Enquiry message" and the device sends the capabilities in the message "UE Capability Information" as described in reference [5]. The mechanism is shown in FIG. 10.

In the current technical setting, the serving base station needs to communicate with its neighboring base station—which are possible candidates for the user equipment to connect during the conditional handover process—to evaluate the loading of each of the neighboring base stations in order to perform appropriate load-balancing assessment. The negotiating of the measurement offsets of the candidate base stations to which the user equipment should connect next due to load balancing reasons ("Global Xn Procedure Mobility Settings Change") can take a time duration that is longer than time the user equipment is within the radio coverage of the serving base station. Hence, it is not possible to provide the appropriate load control information, e.g. a RRC conditional configuration message, to the user equipment before a radio failure occurs. Such radio failures are unwanted by users and by network operators because they decrease the quality of service for the user equipment since the user equipment needs to reconnect to the communication network. This reconnection takes more time and consumes more resources than a smooth handover process. Radio Link Failure can have an interruption time in the order of up to 2000 ms.

SUMMARY

In an embodiment, the present disclosure provides a method for steering communication traffic of a user equipment (UE) in a wireless communication network, wherein the wireless communication network comprises: at least some network entities that are base stations, that are configured to each provide a radio access network (RAN) for the user equipment, wherein a network entity that provides a current access to the network for the UE is called a serving network entity, and wherein each of the at least some network entities is configured to communicate at least with neighboring network entities, wherein an algorithm is implemented on a network unit that performs the following steps:

using as a first input a first time duration TCell, wherein TCell estimates a time duration that the UE is within a radio coverage area of the serving network entity; using as a second input a second time duration TLC, wherein TLC estimates a time duration taken by the network to determine an adjusted load control setting for the UE; comparing TCell against TLC and based on determining that: TCell>TLC: applying load control procedures within a communication network; adding a network-calculated load control information to a Radio Resource Control message; transmitting the Radio Resource Control message with the network-calculated load control information to the UE; or based on determining that: TCell<TLC: transmitting a Radio Resource Control message without the network-calculated load control information to the UE.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 12: shows the content of a "Xn message RESOURCE STATUS UPDATE" message;

FIG. 13: shows the content of a "TNL Capacity Indicator" Information Element (IE) from FIG. 12;

FIG. 14: shows details of Composite Available Capacity Group from FIG. 12.

FIG. 15: shows further details of FIG. 14;

DETAILED DESCRIPTION

Figure 1:
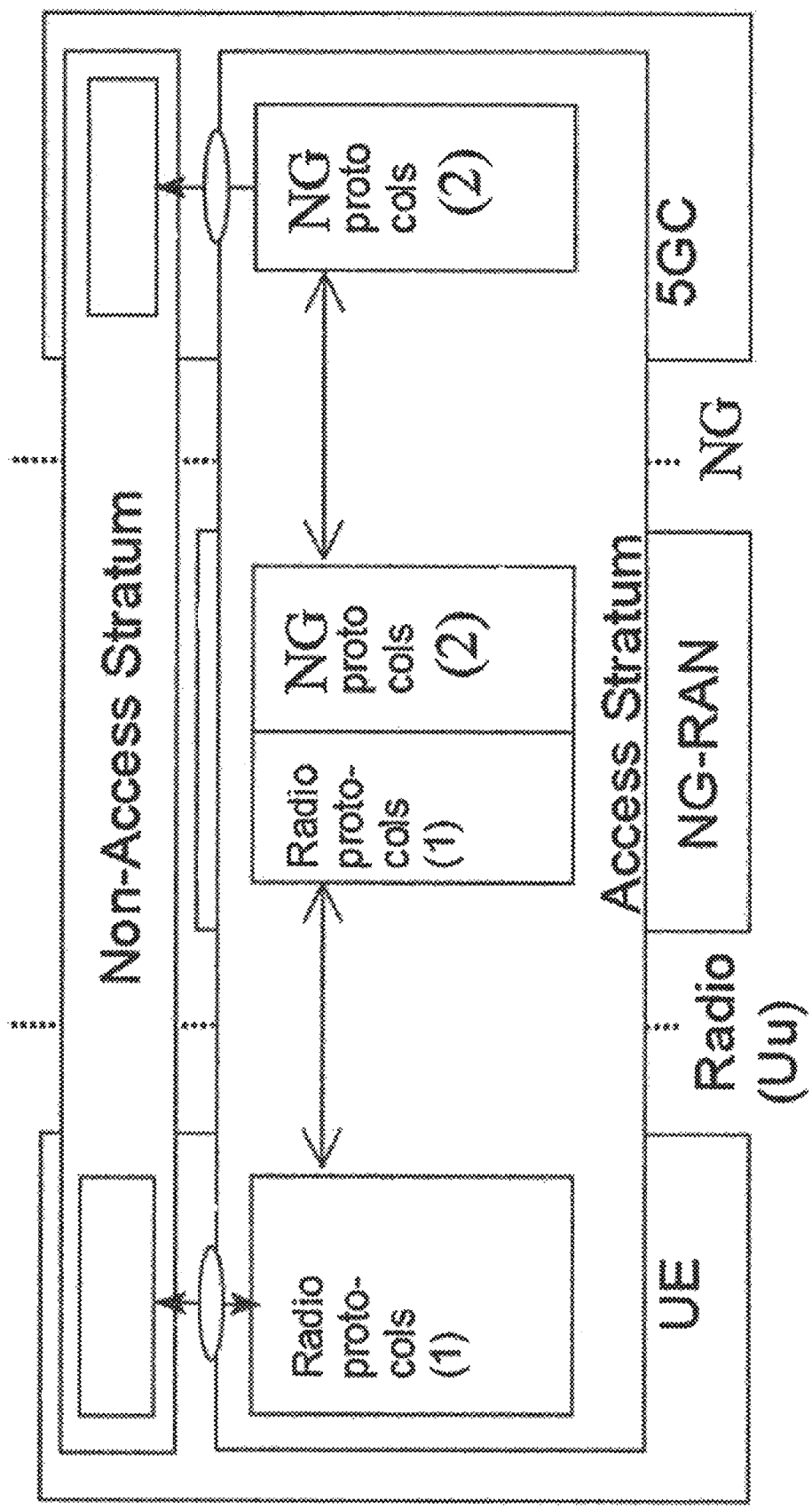
FIG. 1: shows user plane protocols on the Uu- and the NG interfaces in a mobile network scenario.
Figure 2:
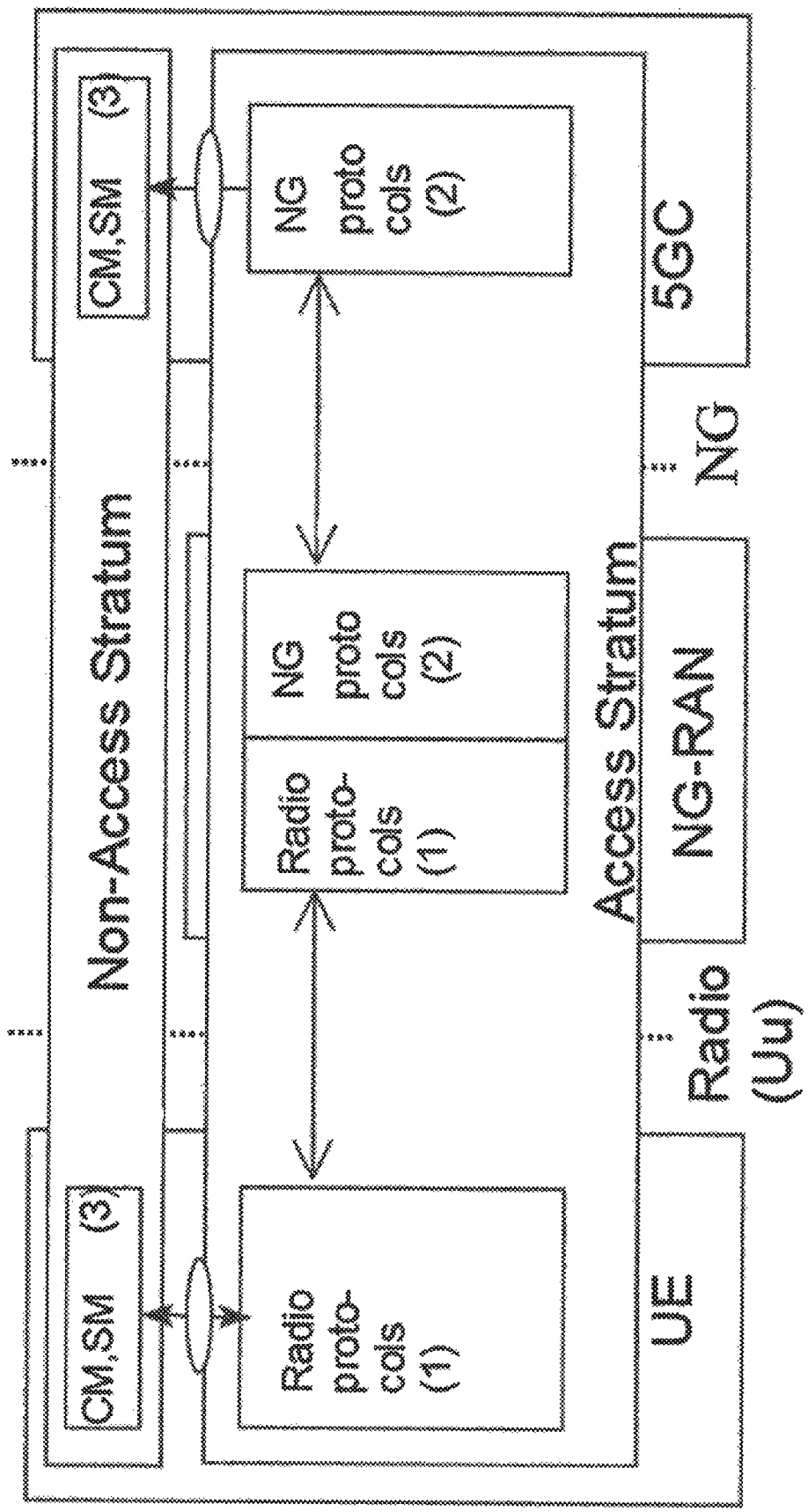
FIG. 2: shows control plane (signaling) protocol stacks on the Uu and the NG-interfaces.
Figure 3:
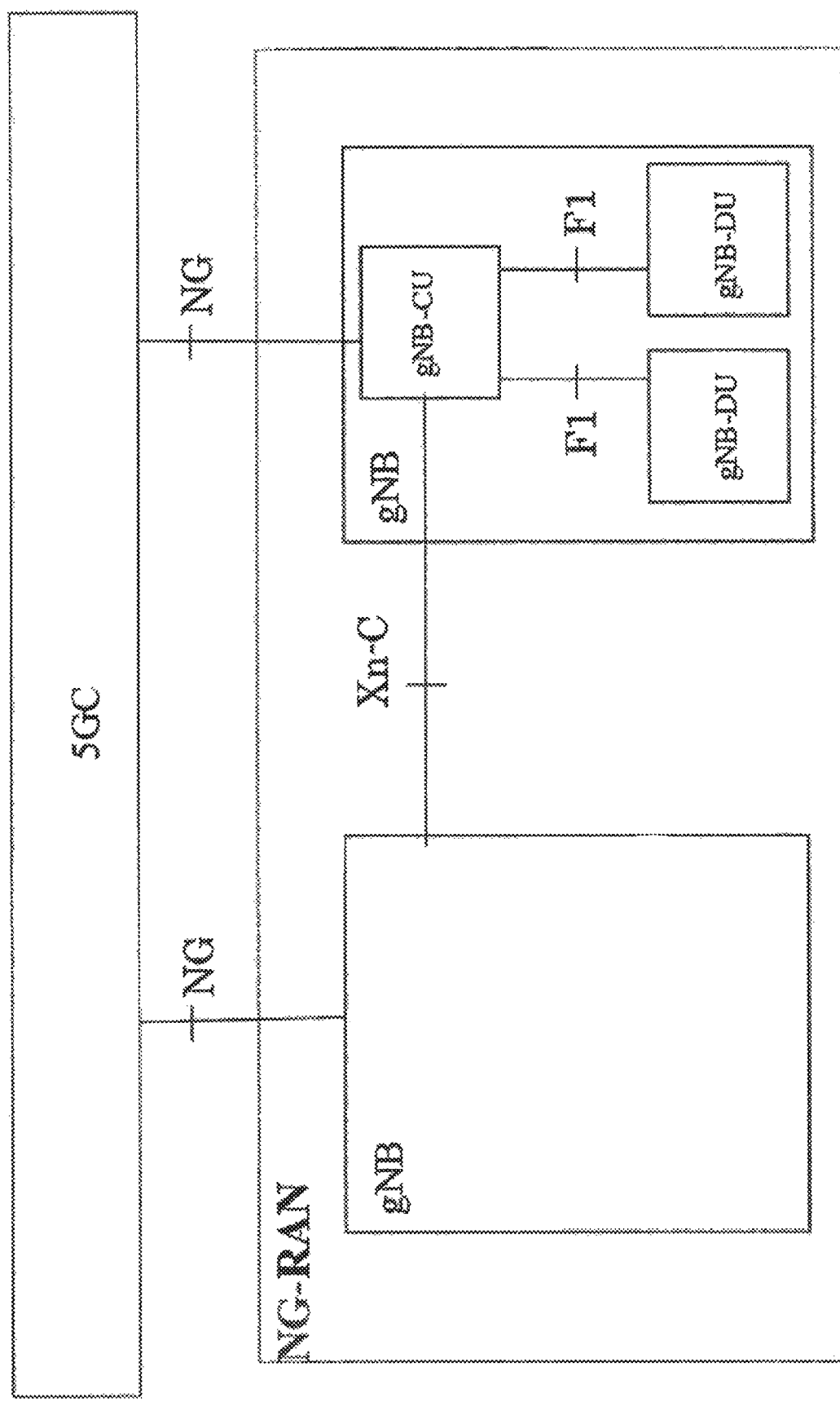
FIG. 3: shows the general architecture of NG-RAN.
Figure 4:
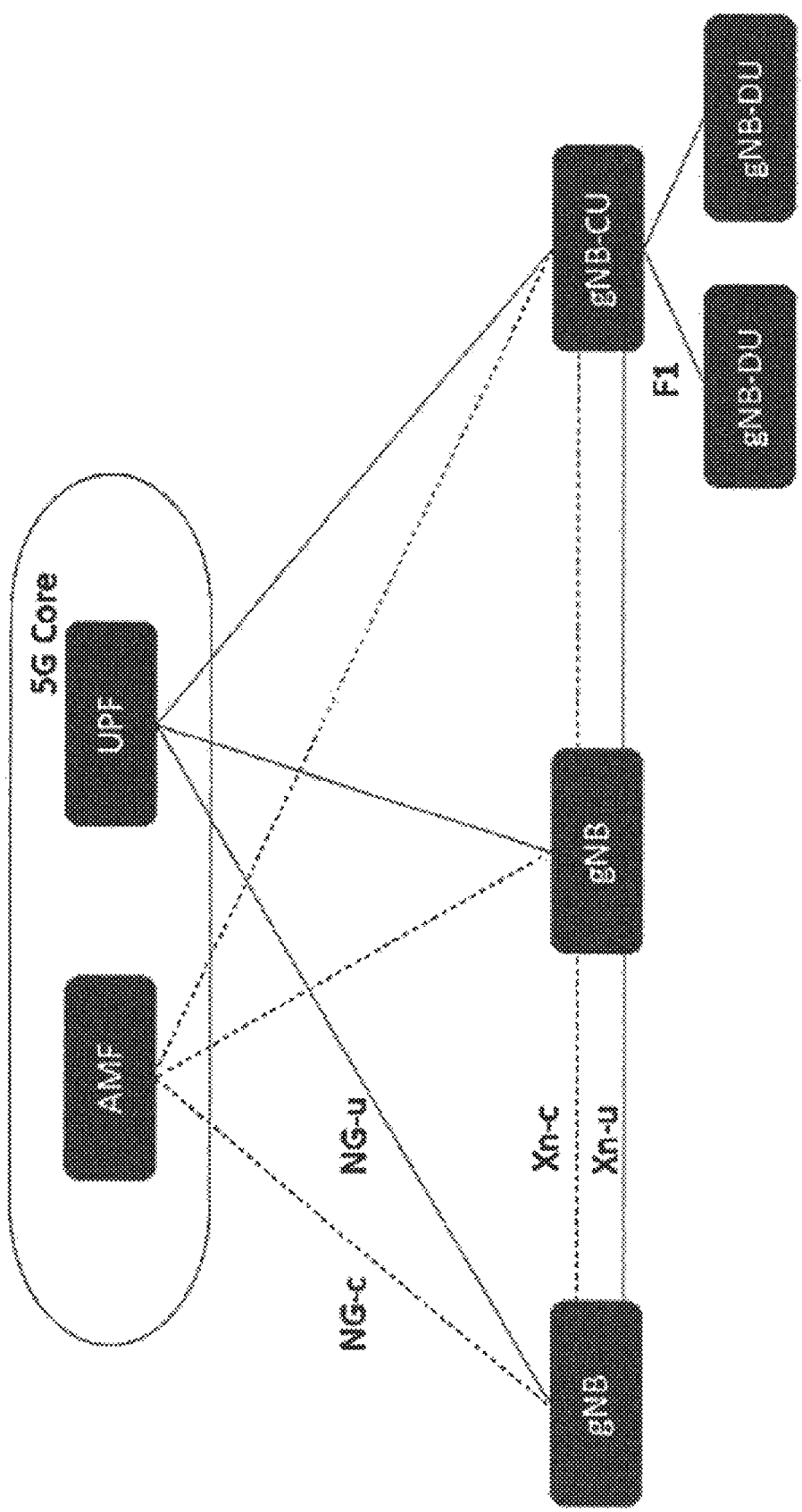
FIG. 4: shows the overall architecture of NG-RAN and 5G Core network.
Figure 5:
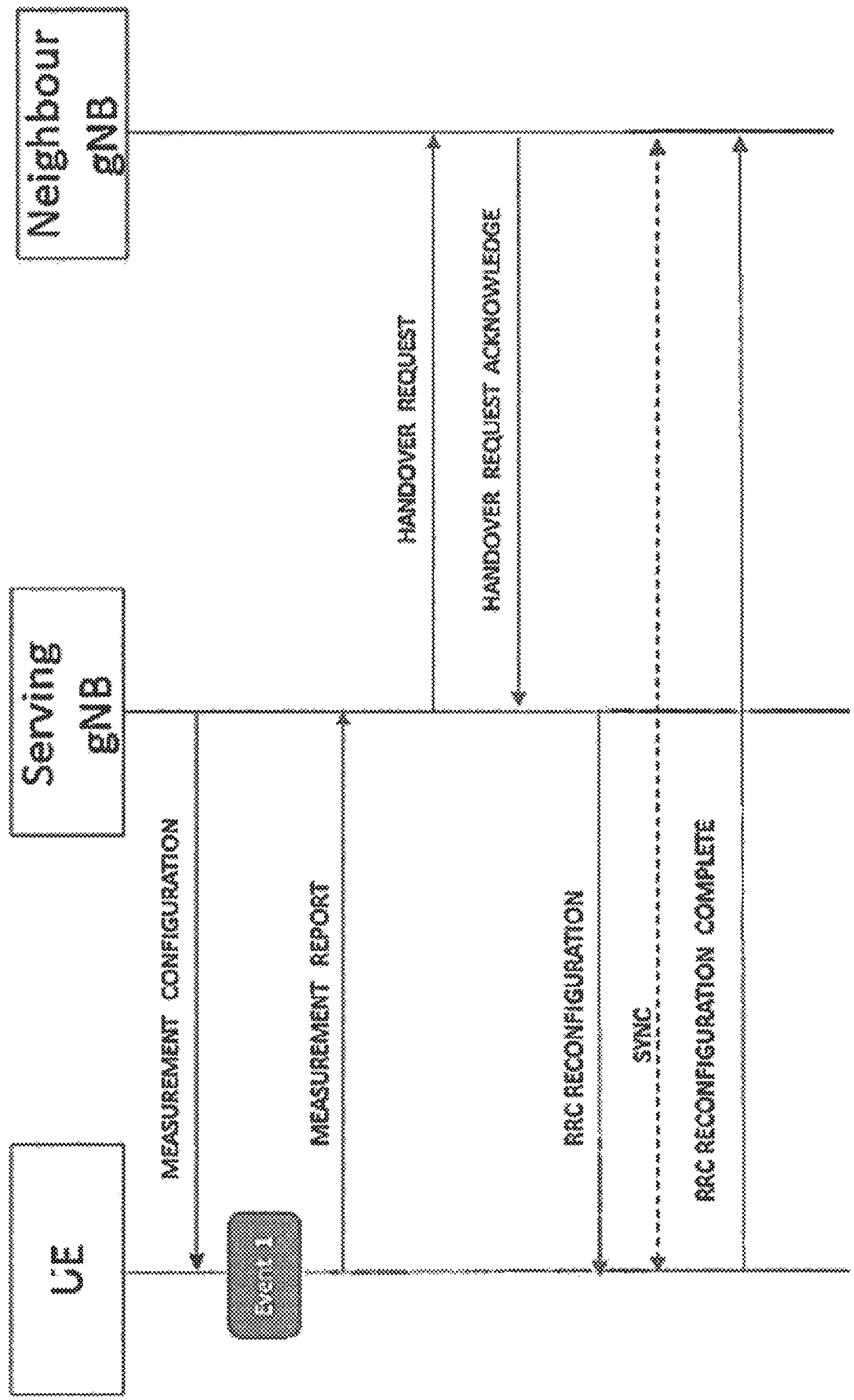
FIG. 5: illustrates a Handover process of a User Equipment.
Figure 6:
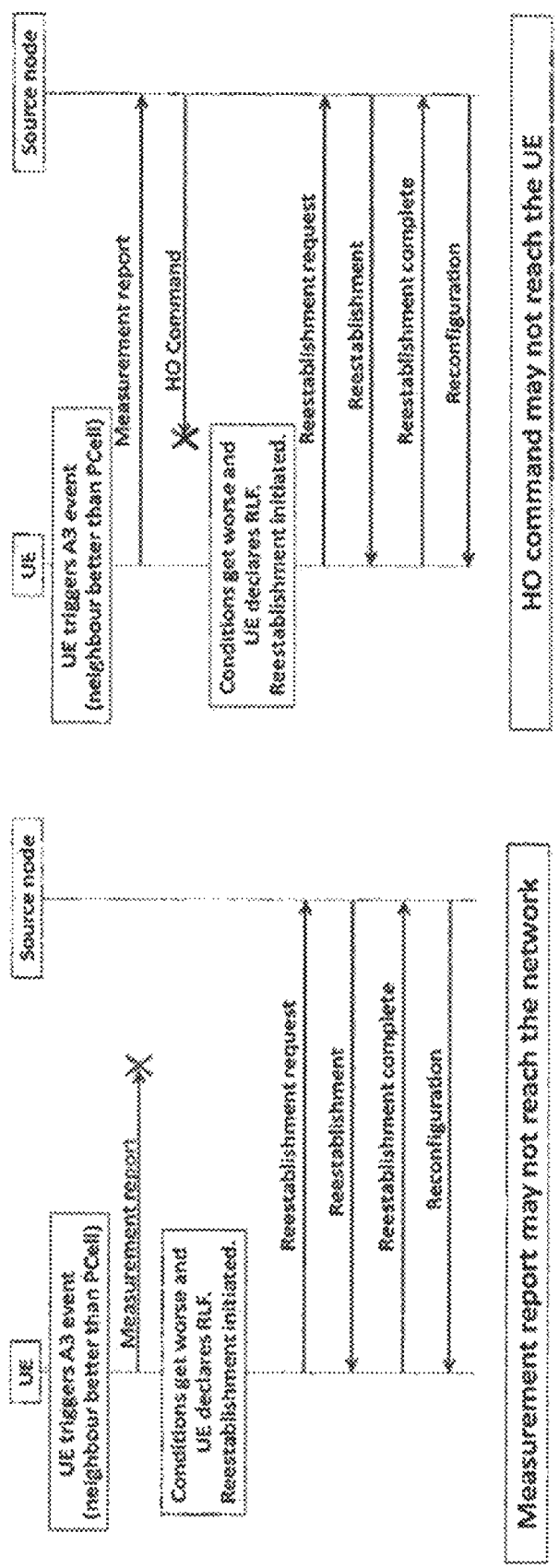
FIG. 6: shows possible technical problems that can occur and can prevent a successful handover process.
Figure 7:
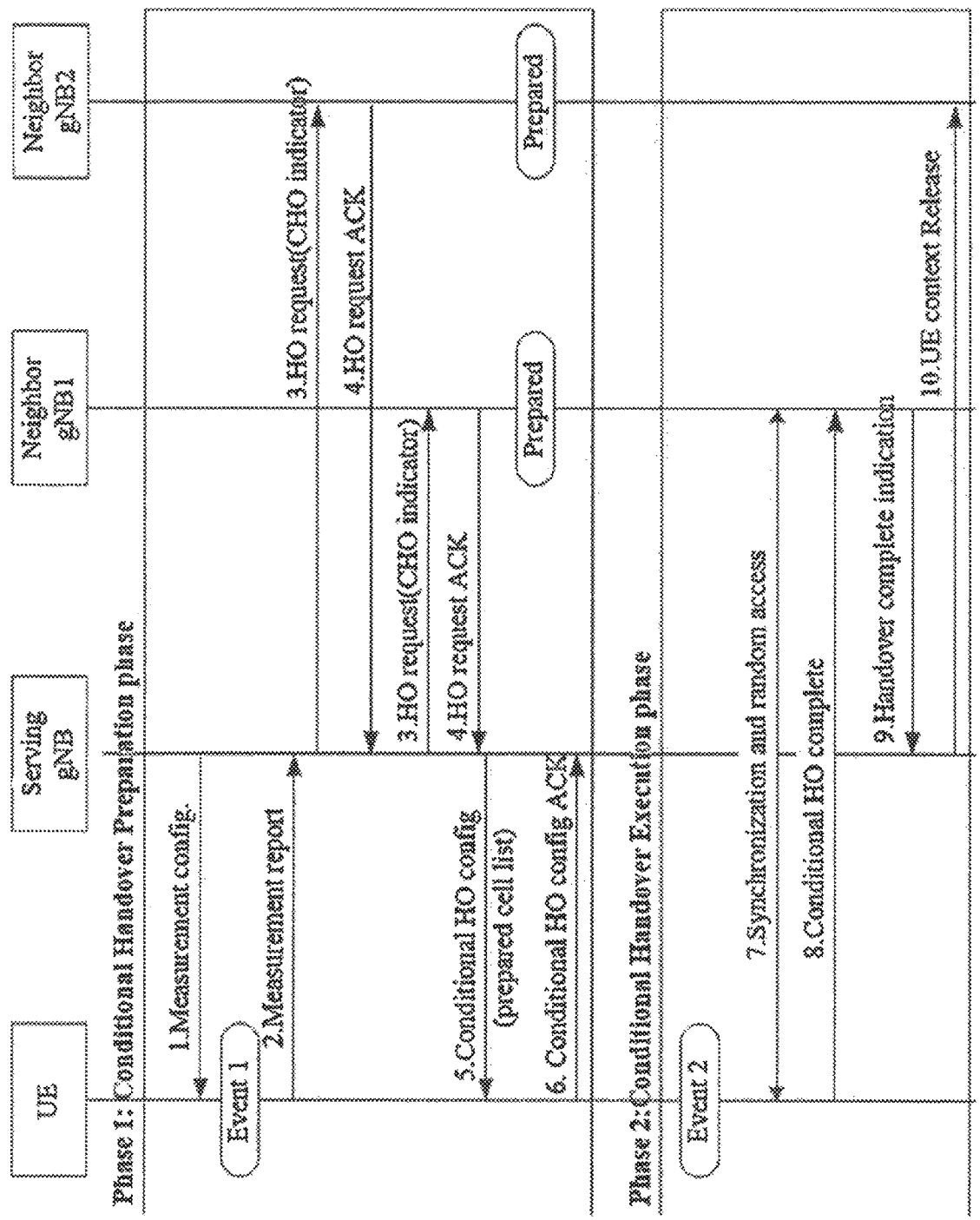
FIG. 7: shows the basic principle of a Conditional Handover (CHO) procedure.
Figure 8:
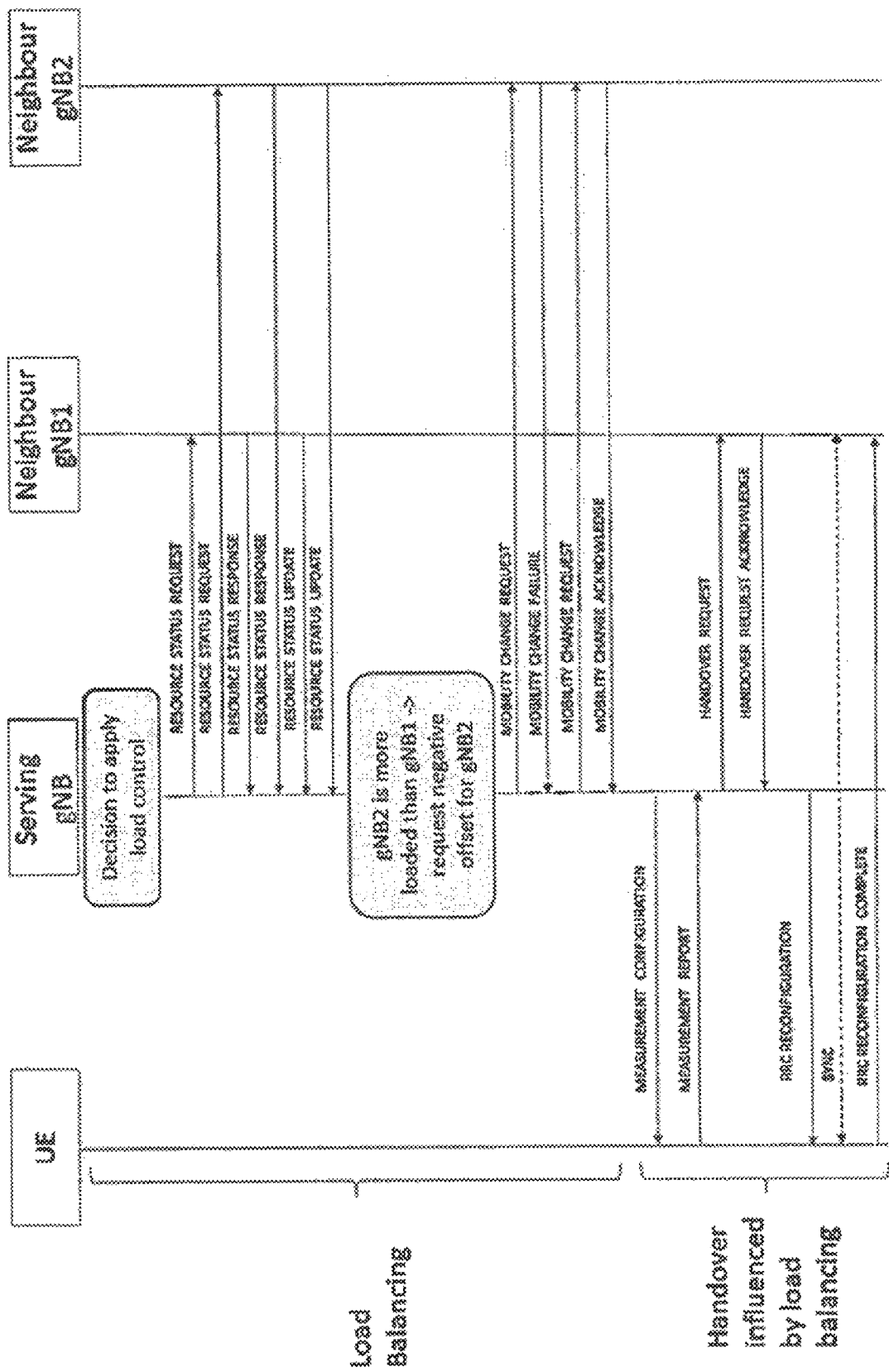
FIG. 8: shows an example of load control in connected mode.
Figure 9:
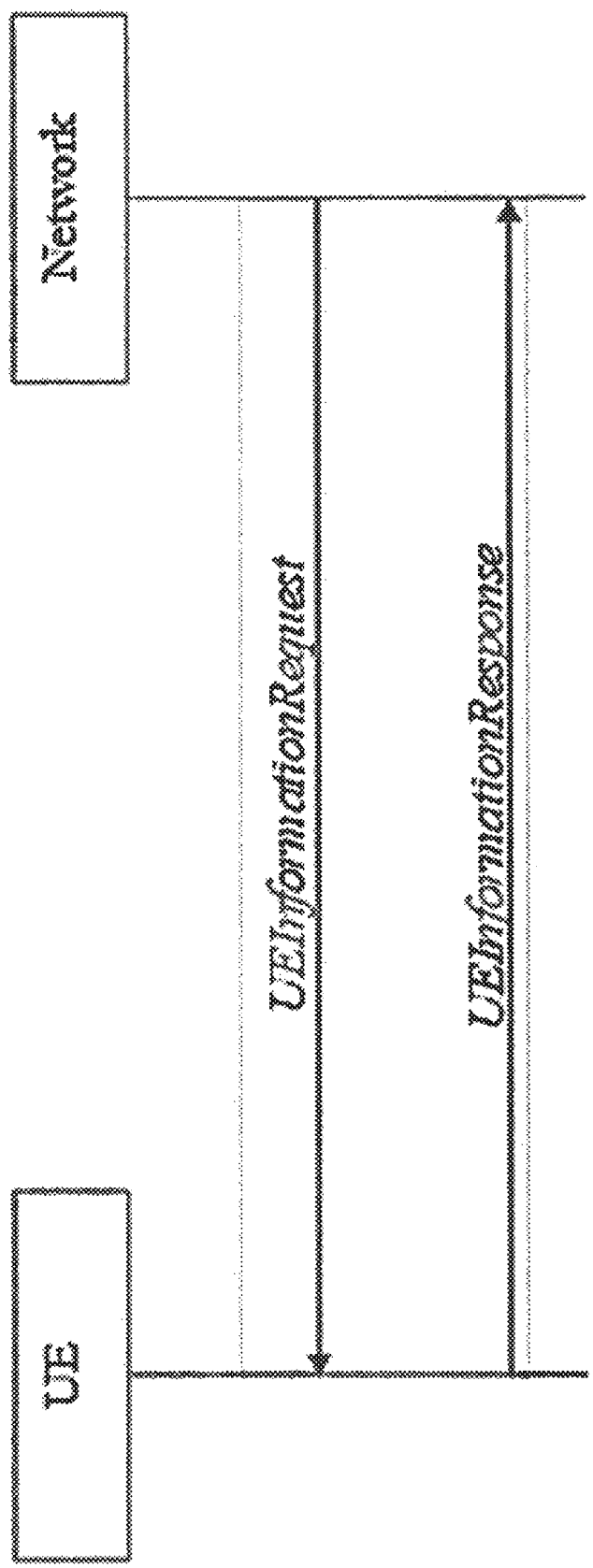
FIG. 9: shows an information exchange between a network entity and a UE based on a UE information request message.
Figure 10:
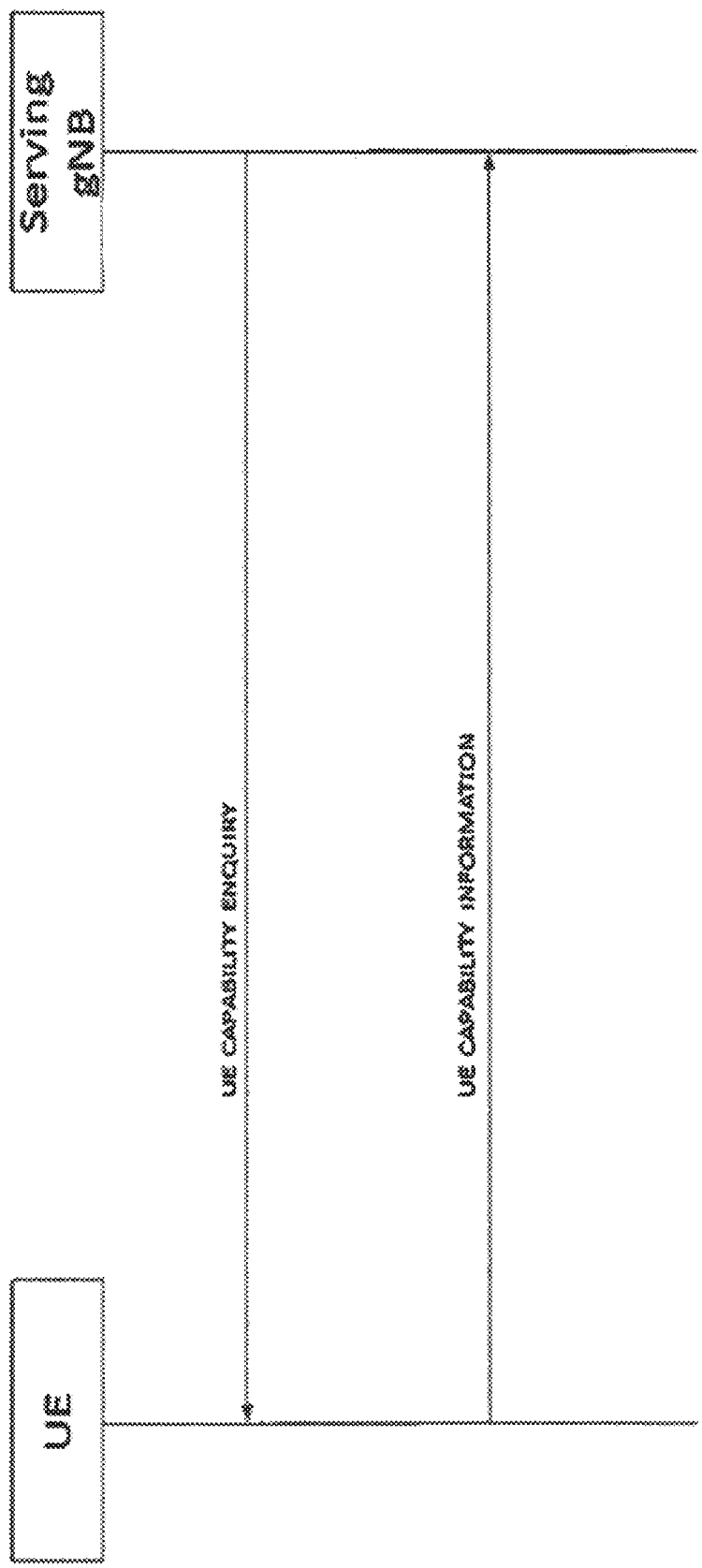
FIG. 10: shows a UE Capability Transfer procedure.

The user equipment is device is very often used when the user is traveling from one place to another. Base stations, which provide access for the user equipment to the communication network, in particular to the Internet, have the limited radio coverage area that is typically called cell. If the user equipment travels outside of the cell, it loses contact with the current base station that leads to the radio link failure if no countermeasures are applied. A typical countermeasure is the so-called handover process, in which the user equipment is connected to another base station before the radio link failure occurs. This is possible because the radio coverage areas of different base stations have radio coverage overlap regions, wherein the user equipment can perform smooth hand over process in these radio coverage overlap regions.

In accordance with an embodiment, the present invention provides techniques for a robust handover process of a user equipment in a wireless communication network. In accordance with another embodiment, the present invention provides load control for the conditional handover procedure.

The features of the various aspects of the invention described below or the various examples of implementation may be combined with each other unless this is explicitly excluded or is technically impossible.

In the context of the invention a UE is a kind of a mobile terminal. In the context of the invention load balancing of network entities, in particular base stations, is facilitated by generating load control information. In this context, the term load control information indicates that the UE is being "controlled" by this information to choose a network entity in the hand over process that was selected due to load-balancing reasons. In principle, the term load control information could also be renamed to load-balancing information.

According to a first aspect of the invention, a method for steering communication traffic of a user equipment (UE) in a wireless communication network is provided. The communication network comprises: at least some network entities, in particular base stations, that are configured to provide each a radio access network (RAN) for the user equipment, wherein the network entity that provides the current access to the network for the UE is called the serving network entity, and wherein each of the network entities is configured to communicate at least with its neighboring network entities, wherein an algorithm is implemented on a network unit that performs the following steps:

Requesting and/or Using, as a first input a first time duration TCell, which estimates a time duration that the UE is within a radio coverage area of the serving network entity;

Requesting and/or Using, as a second input a second time duration TLC, which estimates a time duration it takes the network to determine an adjusted load control setting for the UE, in particular the time duration needed for the "Global Xn Procedure Mobility Settings Change");

Comparing TCell against TLC and if:
TCell>TLC:
Applying load control procedures within the communication network;
Adding a network-calculated load control information to a Radio Resource Control message, in particular to a conditional configuration message. The network-calculated load control information is being calculated by the network entity in a load-balancing process. The serving network entity and its neighboring network entities communicate load information with each other, based on this information exchange, the network-calculated load control information can be determined.

Transmitting, in particular by the network entity, the Radio Resource Control (RRC) message with the network-calculated load control information to the UE; the RRC message can be configured so that it enables the user equipment to perform the handover process from the serving network entity to a specific neighboring entity, wherein the specific neighboring entity can be selected based on load-balancing reasons.

If certain triggering conditions are met, in particular when the signal strength of a neighboring base station becomes better than the signal strength of the serving base station by an offset or the signal strength of the serving base station becomes worse than a first threshold and the signal strength of the neighbor base station becomes better than a second threshold, conditional handover process can be initiated by the user equipment before a radio link failure occurs. The user equipment can use the network-calculated control information to connect to a specific neighboring network entity during the handover process.

Radio Resource Control message: The Radio Resource Control (RRC) protocol is used in UMTS, LTE and 5G on the Air interface. It is a layer 3 protocol used between UE and Base Station. This protocol is specified by 3GPP for UMTS, for LTE and for 5G New Radio. RRC messages are transported via the PDCP and underlying protocols. The major functions of the RRC protocol include connection establishment and release functions, broadcast of system information, radio bearer establishment, reconfiguration and release, RRC connection mobility procedures, paging notification and release and outer loop power control. By means of the signaling functions the RRC configures the user and control planes according to the network status and allows for Radio Resource Management strategies to be implemented.

or if:

TCell<TLC:

Transmitting, in particular by the network entity, a Radio Resource Control without the network-calculated load control information to the UE.

This provides the advantage of ensuring a robust way to steer the communication of the user equipment from the serving network entity to the neighboring network entity in a handover process while at the same time providing load-balancing within the communication network by providing the appropriate network-calculated load control information if this information can be sent to the user equipment before a radio link failure occurs, which is the case for TCell>TLC. On the other hand, if TCell<=TLC, the user equipment would probably leave the radio coverage of the serving network entity before the time needed to generate the load control information is over. In this case a radio link failure is prevented by omitting the procedure for generating the load control information within the network ("Global Xn Procedure Mobility Settings Change") and sending instead a Radio Resource Control conditional configuration message without the network-calculated load control information to the UE so that it can perform the handover process when the CHO triggering condition is reached.

For example, by means of the Radio Resource Control without the network-calculated load control information the UE can randomly connect to a any neighboring network entity on its own account. In both cases, a radio link failure is sufficiently prevented and in the first case it is even possible to apply load-balancing mechanisms to further increase the efficiency of the communication network. Hence, load control is performed by the UE and/or by the network. As it will be seen later in the text, in an embodiment of the invention it is even possible to apply load-balancing mechanisms in the second case by including so called network-mapped information in the RRC message.

The network entities can be defined by functional means; i.e. as an entity that is configured to provide a radio access network. There are several such entities having this functionality like base stations, eNodeBs, WLAN routers or WLAN access.

The network unit can be defined by functional means, i.e. as the unit on which the algorithm is implemented and carried out. Basically, this network unit can be located anywhere within the communication network. It can be a server within the core network. Of course, in this case it can be different from the network entities and is therefore described with another term, namely unit. However, it is also possible that this algorithm can be implemented on the network entity, e.g. implement on the base station. In some embodiments, the network entity has a processing unit to carry out its tasks so that an algorithm can be also implemented on the network unit, in particular on a base station. In this embodiment of the invention, the entity and the unit would the same but this is not the general case.

The term "To provide each a radio access network" describes that each network entity can provides a radio access network. These can be different RANs. The difference can based on the applied technique LTE, 5G or simply that the different radio access networks are provided by different telecommunication providers.

Hence, the invention can be named "Conditional distributed load control" because based on the condition (relationship between TCell and TLC) the load control can be distributed between UE and network side (for TCell<=TLC).

The "Conditional distributed load control" makes the application of load control in conjunction with Conditional Handover (CHO) possible under all conditions, i.e. when channel conditions are rapidly changing as well (remaining time in the cell is shorter than or equal to delay of the mobility settings procedure). Even more advantageously, legacy centralized load control can be executed whenever possible.

"Conditional distributed load control" eliminates ambiguity in a decision for a particular cell out of the set of candidate neighboring cells when several cells satisfy Conditional Handover (CHO) triggering condition. The ambiguity stems from the formulation in the current specification that the choice of a particular cells out of several cells satisfying CHO triggering condition "Event 2" can be left to the UE implementation.

"Conditional distributed load control" provides the mentioned benefits and with only a modest increase in UE and network complexity.

"Conditional distributed load control" enables the network to basically use legacy solution (centralized load control) as far as possible thus eliminating risks of eavesdropping by competition where signaling of load or capacity values is implemented as extension of "RRC Reconfiguration" message.

"Conditional distributed load control" may not be introduced in the whole terminal population simultaneously. Assuming the feature is introduced firstly on the network side, capability control enables usage of the feature only if it has been fully integrated and tested on the side of the terminal.

In an embodiment, the Radio Resource Control message is provided with network-mapped load control information for the UE in the case of TCell<=TLC. In this case the load control is actually performed by the UE. The network-mapped load control information has the effect, that the Radio Resource Control messaging looks in principal identical for the UE as if network-calculated load control information were used. This enables the UE to use the similar algorithm to perform the CHO process as in the former case. The difference between the network-mapped load control information within the RRC message (TCell<=TLC) and the network-calculated load control information within the RRC message (TCell>TLC) is that there is basically no time delay introduced by adding the network-mapped load control information to the RRC message. The network-mapped load control information can be randomly generated within the serving network entity or just be extracted from a lookup table in which typical load situations are stored. It is also possible that the standard RRC message already includes an information element with pre-specified network-mapped load control information, which further reduces the time delay. Of course, it can happen that the UE connects in this case to a neighboring network entity based on the non-network based load control information that would not be the preferred network entity due to load-balancing reasons. But since any time delay is avoided, this efficiently prevents radio link failure.

In an embodiment, the algorithm is implemented on the serving network entity. Since the serving network entity is typically the serving base station that grants the network access for the user equipment, this feature has the effect to further reduce latency in determining the load control information since all network entities along with the UE are spatially as close to each other as possible.

In an embodiment, TCell is estimated based on status information of the UE. This status information can be a time interval the UE typically spends in a cell, local coordinates of the UE and/or a measured velocity of the UE. For example, the servicing network entity has information about its radio coverage area. Hence, if the local coordinates of the UE is known along with the actual measured velocity of the UE, it is possible to calculate the time duration until the UE leaves the radio coverage area of the serving network entity, which is specified as being the time duration TCell.

In an embodiment, the serving network entity requests the status information from the UE. In particular, the serving network entity requests the status information from the UE after the UE gets a RRC message from the serving network entity for the future handover process. This has the advantage to efficiently reduce network traffic and computational resources, in particular of the UE, since the status information is only requested when it is actually needed.

In an embodiment, TLC is estimated based on a status information exchange between the serving network entity and its neighboring network entities. The serving network entity can use the available uplink and downlink capacity values of the respective neighboring entities to estimate the time it takes to perform the load-balancing adjustment within the network. Basically, the maximum time duration TLC is being dominated by the neighboring network entity with the lowest available uplink and downlink capacity values. An alternative approach could be to record typical measured TLC durations in a lookup table and then select the most frequent TLC or a time duration which is larger than predefined percentage of typical TLC values. For example, if TLC is to be chosen to be greater than 95% of the typical TLC values, this prevents that TLC is underestimated.

In an embodiment, the serving network entity requests the respective status information of its neighboring network entities. This facilitates an efficient use of the communication network resources, because the data traffic is being only increased if the respective information is actually needed.

In an embodiment, the network-calculated load control information and/or the network-mapped load control information are offset values, capacity values, load values or priority values characterizing each neighboring network entity. In case of network-mapped load control information, it is to be noted that offset values can be also taken from a look-up table and not calculated in the network. In this way it can be determined to what cell UE should have a preference to connect to. This enables the UE to efficiently select neighboring network entity due to the load control information. Transmitting only priority values has the additional benefit that the actual load of the network entities can be encrypted so that hackers or competing network operators do not get information about the respective communication network if they eavesdrop the RRC messages.

In an embodiment, the comparison is performed by using T #LC instead of TLC, with T #LC=TLC+Tsafety, wherein Tsafety is a safety time interval that ensures that TLC is not too close to TCell. The safety time interval Tsafety efficiently prevents a radio link failure case if TLC is close to TCell. Because the determination of TLC and TCell are only estimations, it is possible that the actual value differs by some degree that can cause radio link failure even if the estimation yields TLC<TCell.

In an embodiment, Tsafety is adapted dynamically according to a previous success rate. Of course, if Tsafety is chosen to be quite large, this has the advantageous effect that radio link failure is efficiently prevented but also the downside that network-based load-balancing is not being performed. Hence, if Tsafety is adapted dynamically adapted to a value that matches the predefined success rate, the network operator can optimize the procedure according to his wishes. For example, the network operator can define that he wishes an actual success rate, i.e. that radio link failure is prevented, of 90%. If a certain value of Tsafety yields a success rate of 95%, then it is possible to dynamically decrease Tsafety until the success rate of 90% is reached. This has the result that more network-based load balancing will be performed as in the case of a larger value of Tsafety.

In an embodiment, the UE starts a Conditional Handover (CHO) process to connect to another network entity based on the Radio Resource Control message if the UE detects a CHO condition. This has the effect that the RRC message is only used if the UE release the cell of the serving network entity and that radio link failure is efficiently prevented in that case.

In an embodiment, the network-calculated load control information depends on a current application running on the UE. Network entity can be designed in the 5G environment to be adapted to specific slices of the 5G network. Those specific slices aim to be tailored to specific needs of user equipment or of applications running on the user equipment. Hence, load-balancing can also take into account which of the neighboring network entities provides a 5G slice that matches best the needs of the user equipment and/or of the application running on the user equipment.

According to a second aspect of the invention, a wireless communication system is disclosed, wherein the wireless communication system comprises:
- a wireless communication network;
- a user equipment configured to connect to the wireless communication network and to exchange data with the communication network;
- at least some network entities, in particular base stations, which are configured to provide each a radio access network (RAN) for the user equipment, wherein the network entity that provides the current access to the network for the UE is called the serving network entity,
- a wireless and/or wired communication link between the serving network entity and its neighboring entities;
- a processor unit implemented in the serving network entity, wherein the processor is configured to perform the method described above to steer communication traffic of the user equipment (UE) in the wireless communication network.

This communication system has the advantage that it is configured to enable "Conditional distributed load control".

According to a third aspect of the invention, network entity, in particular a base station, is disclosed, wherein the network entity comprises:
- a first communication interface to provide a radio access network (RAN) for a User Equipment;
- a second communication interface to communicate in a wired or wireless fashion with further network entities;
- a processor unit implemented in the serving network entity, wherein the processor is configured to perform the method described above to steer communication traffic of the user equipment (UE) in the wireless communication network.

This network entity has the advantage that it is configured to enable "Conditional distributed load control".

According to a fourth aspect of the invention, a user equipment, is disclosed, wherein the user equipment comprises:
- a first communication interface configured to communicate with a network entity as described above, wherein the network entity provides access to a communication network for the UE;
- a processor unit implemented in the UE, wherein the processor is configured to transmit the status information of the UE upon receiving a request by the network entity and wherein the processor is configured to perform a handover procedure according to a method described above.

This user equipment has the advantage that it is configured to enable "Conditional distributed load control".

In the following, implementation examples of the present invention are explained with reference to the accompanying FIGURE:

In the following, numerous features of the present invention are explained in detail by means of embodiments. The present disclosure is not limited to the specifically named combinations of features. Rather, the features mentioned here can be combined arbitrarily into inventive embodiments, unless this is expressly excluded below.

Centralized load control that is performed by changing the cell-specific offsets for handover measurements is described above. In the description legacy handover procedure (that is different from conditional handover (CHO)) is assumed.

When describing the invention (see FIG. 11), it is assumed that centralized load control can be combined with conditional handover within a network 90. Apart from only considering radio conditions, considerations of load conditions play a role in the handover process, too. This makes making resource utilization in the system more equitable In the following, the situation of several overlapping neighboring cells simultaneously reaching a triggering condition "Event 2" for configuration of possible CHO neighboring cells will be considered.

Figure 11:
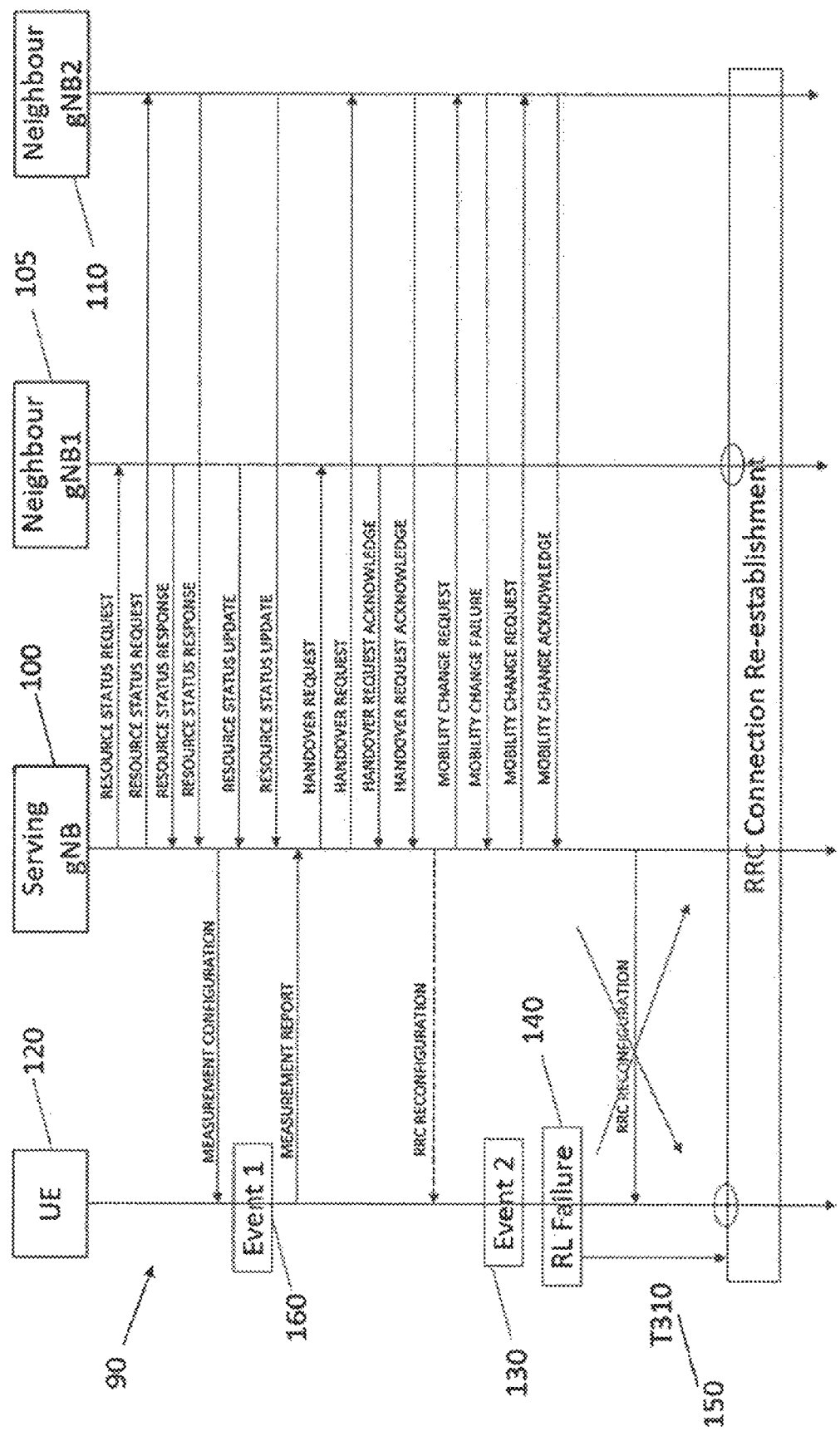
FIG. 11: shows a load control algorithm, which is implemented in a serving network entity.

As shown in FIG. 11, load reporting over a "Xn interface" is configured by exchanging the messages "RESOURCE STATUS REQUEST", "RESOURCE STATUS RESPONSE" between a serving network entity 100 and one or multiple neighboring network entities 105, 110. In a specification, the network entities 100, 105, 110 are base stations configured to provide access to 5G and LTE communication networks. In a further specification the serving network entities 100, 105, 110 are gNBs 100,105, 110 to provide access to a 5G network. Typical implementation of the load reporting via the "Xn interface" will result in periodical sending of a message "RESOURCE STATUS UPDATE" that contains load information from the neighbor gNBs 105, 110 to the serving gNB 100. (These messages for load control are described in detail in reference [6].) In some embodiments, if multiple configured gNBs 105, 110 fulfill the criterion for triggering the CHO "Event 2" 130, a load control mechanism needs to make a choice between those gNBs 105, 110. This can be done by prioritizing certain cells or the respective gNBs 105, 110. In current Radio Resource Control (RRC) specifications, standard-specific means to prioritize the cells during CHO are not stated, it is left rather to a UE implementation (for details see reference [5]).

In FIG. 11 a load control algorithm is implemented in the serving gNB 100, wherein the load control algorithm is configured to detect if neighbor gNB2 110 has a worse load situation compared to neighboring gNB1 105. This detection is based on the information provided in the message "RESOURCE STATUS UPDATE". Hence, it is desirable to apply centralized load control and configure a negative measurement offset for the cells belonging to neighbor gNB2 so that the device can handover to one of the cells belonging to neighbor gNB1. (This negative offset could be transmitted to the UE in a RRC RECONFIGURATION message).

For this purpose, a "Global Xn Procedure Mobility Settings Change" described in reference [5] can be applied (related messages are "MOBILITY CHANGE REQUEST", "MOBILITY CHANGE FAILURE" and "MOBILITY CHANGE ACKNOWLEDGE"). The signaling related to this procedure is exchanged over an "Xn interface" between serving gNB 100 and neighboring gNBs 105,110 thus causing additional latency before sending "RRC RECONFIGURATION" to a user equipment (UE) 120 with configuration of the cells that are candidate cells for execution of the conditional handover (exact contents of the message RRC RECONFIGURATION with respect to the configuration of candidate CHO cells is given in the IE ConditionalReconfiguration-r16 in reference [5]).

However, it may happen that during the time period corresponding to this latency, which is dominated by the serving gNB 100 and neighboring gNB2 110 processing times and Xn interface latency, the signal quality of the serving cells related to the gNB 100 rapidly worsens and that sending of the conditional handover reconfiguration message becomes impossible due to a Radio Link Failure 140. Thus, the radio link needs to be reestablished and the robustness, which was aimed to be introduced by the conditional handover, will be lost since the handover cannot be executed. Recovery from the Radio Link Failure is dominated by Interruption time of the order of "T310" 150 (up to 2000 ms) as described in reference [5].

The technical setup related to FIG. 11 assumes that RRC Connection Re-establishment would be done towards neighboring gNB1 105 by broadcasting corresponding cell selection parameters to the UE 120 with offsets used to implement the load control.

Omitting the "Global Xn Procedure Mobility Settings Change" could lead to timely sending and execution of Conditional Handover but without the respective configuration of load control that can define specific measurement offsets for each gNB prior to sending RRC Reconfiguration message. According to the current state of the specification, the candidate CHO neighboring cells fulfilling triggering condition "Event 1" 160 would have to be prioritized according to an UE 120 implementation specific solution. However, typically a network provider cannot influence choices made by specific UE 120 implementations.

Sending the RRC Reconfiguration message without load control information could result in a handover towards neighboring gNB2 110—even if gNB1 105 would be the preferred choice of the network operator due to load balancing issues. In this case, load control could not be applied instantly but would have to be executed later. For example, by redirecting the UE 120 to neighboring gNB1 105. However, this possibly leads to increased signaling load and new interruptions. But, this situation is still a preferred choice compared to a total RL Failure when the UE 120 gets out of communication reach with its serving gNB 100.

Hence, the network 90, in particular the serving gNB 100, has to make a choice if there is enough time to send the RRC Reconfiguration message with load control information or if it shall send RRC Reconfiguration message without load control information as soon as possible to avoid RL Failure 140.

A solution of the problem will be presented in the following in which load control is always implemented in at least some of the gNBs.

Conditional Distributed Load Control
Solution on the Network Side:

In order to apply load control, the network supplies additional information, e.g. in the form of load indication or neighbor cell priority, thresholds and/or offsets associated with these pieces of information, to the UE 120 so that the load control can be performed partly by network and partly by terminal. But the network 90 shall only send this information to perform conditional handover if the gathering of these information is shorter than time duration until RL Failure 140 occurs.

To meet this purpose, a further load control algorithm can be implemented on the UE 120. The UE 120 uses the supplied information inside the further load control algorithm to prioritize the neighboring cells/neighboring gNBs and to perform conditional handover. When supplying the additional information to the UE 120, the network needs to perform a first Estimation whether the execution of the "Global Xn procedure Mobility Settings Change" would in the meantime lead to unacceptable worsening of radio conditions and subsequent Radio Link Failure, T310 Expiry and RRC Connection Reestablishment with increased interruption time.

Estimating the Remaining Time in the Cell

In order to perform a first estimation of the time duration TCell the UE is within the radio coverage area of the serving gNB 100, the serving gNB 100 uses information obtained in the Mobility History SON Report (IE VisitedCellInfoList) as well as in the Logged Measurement SON Report (IE LocationInfo-r16) and the collected load information and channel measurements to estimate whether "Global Xn procedure Mobility Settings Change" would lead to Radio Link Failure 140 before RRC Reconfiguration message can be sent. The abbreviation IE means Information Element.

According to reference [5], the contents of the IE VisitedCellInfoList within Mobility History Report is the following:

```
-- ASN1START
-- TAG-VISITEDCELLINFOLIST-START
VisitedCellInfoList-r16 ::= SEQUENCE (SIZE (1..maxCellHistory-r16))
OF
VisitedCellInfo-r16
VisitedCellInfo-r16 ::=       SEQUENCE {
   visitedCellId-r16             CHOICE {
      nr-CellId-r16                 CHOICE {
         cgi-Info                      CGI-Info-Logging-r16,
         pci-arfcn-r16                 SEQUENCE {
            physCellId-r16                PhysCellId,
            carrierFreq-r16               ARFCN-ValueNR
         }
      },
      eutra-CellId-r16              CHOICE {
         cellGlobalId-r16              CGI-InfoEUTRA,
         pci-arfcn-r16                 SEQUENCE {
            physCellId-r16                EUTRA-PhysCellId,
            carrierFreq-r16               ARFCN-ValueEUTRA
         }
      }
   }                                             OPTIONAL,
   timeSpent-r16                 INTEGER (0..4095),
   ...
}
-- TAG-VISITEDCELLINFOLIST-STOP
-- ASN1STOP
```

A relevant IE is timeSpent-r16, which indicates the duration of stay in the cell or in any cell selection state and/or camped on any cell state in NR or E-UTRA approximated to the closest second. This information can be used to estimate the speed of the terminal, in particular in conjunction with a parameter velocityEstimate-r16 from a further IE.

According to reference [5], the contents of the IE LocationInfo-r16 within Logged Measurement Report is the following

```
-- ASN1START
-- TAG-LOCATIONINFO-START
LocationInfo-r16 ::=          SEQUENCE {
   commonLocationInfo-r16       CommonLocationInfo-r16
OPTIONAL,
   bt-LocationInfo-r16          LogMeasResultListBT-r16
OPTIONAL,
   wlan-LocationInfo-r16        LogMeasResultListWLAN-r16
OPTIONAL,
   sensor-LocationInfo-r16      Sensor-LocationInfo-r16
OPTIONAL,
   ...
}
-- TAG-LOCATIONINFO-STOP
-- ASN1STOP
-- ASN1START
-- TAG-COMMONLOCATIONINFO-START
CommonLocationInfo-r16 ::= SEQUENCE {
   gnss-TOD-msec-r16            OCTET STRING       OPTIONAL,
   locationTimestamp-r16        OCTET STRING       OPTIONAL,
   locationCoordinate-r16       OCTET STRING       OPTIONAL,
   locationError-r16            OCTET STRING       OPTIONAL,
```

-continued

```
    locationSource-r16      OCTET STRING    OPTIONAL,
    velocityEstimate-r16    OCTET STRING    OPTIONAL
}
-- TAG-COMMONLOCATIONINFO-STOP
-- ASN1STOP
```

CommonLocationInfo Field Descriptions:
location TimeStamp: Parameter type DisplacementTimeStamp defined in TS 37.355. The first/leftmost bit of the first octet contains the most significant bit.
locationCoordinate: Parameter type LocationCoordinate defined in TS 37.355. The first/leftmost bit of the first octet contains the most significant bit.
locationError: Parameter LocationError defined in TS 37.355. The first/leftmost bit of the first octet contains the most significant bit.
locationSource: Parameter LocationSource defined in TS 37.355 [49]. The first/leftmost bit of the first octet contains the most significant bit.
velocityEstimate: Parameter type Velocity defined in TS 37.355 [49]. The first/leftmost bit of the first octet contains the most significant bit.

A relevant IE is the locationCoordinate-r16, which indicates the position of the terminal in the cell. Estimated speed and position can be used to estimate the minimum remaining time the mobile terminal can spend in the cell without experiencing unacceptable degradation of the radio quality.

The network can obtain Mobility History SON Report and Logged Measurement SON Report by using UE Information Request/Response messages to retrieve these reports from the UE 120.

Estimating the Delay of the Global Xn Procedure "Mobility Settings Change":

In order to determine as a second estimate, the time delay TLC of the Global Xn Procedure "Mobility Settings Change", a look into the content of the "Xn message RESOURCE STATUS UPDATE of each possible candidate gNB 105, 110 may be necessary. According to the specification in reference [6] the content of the message is shown in FIG. 12.

The IE (Information Element) "TNL Capacity Indicator" is further described as shown in FIG. 13 in the same specification, i.e. in reference [6].

The serving gNB 100 can use the "TNL Capacity Indicator" information about the offered and available capacity in DL (download) and UL (upload) direction of each gNB 105, 110 to estimate the transmission delay of the messages over the respective "Xn interface. Based on prior reporting of "TNL Capacity Indicator", a look-up table comprising capacity values and corresponding measured delays can be stored in the serving gNB 100 for each of the neighboring gNBs 105, 110. Then the time delay TLC of the "Global Xn Procedure Mobility Settings Change" can be obtained by simple linear interpolation or extrapolation of delay over capacity values.

As stated before, to enable load control in the UE 120, the network extends the contents of the message RRC RECONFIGURATION with various information like load information, thresholds and priority information. In the simplest case, the network transmits a value of an IE Capacity Value, or (100−Capacity Value) as load information per neighbor cell.

The Composite Available Capacity Group IE is also shown in FIG. 12 and indicates the overall available resource level per cell and per SSB area in the cell in Downlink and Uplink direction that is shown in FIG. 14.

The Composite Available Capacity IE as shown in FIG. 15 indicates the overall available resource level in the cell in either Downlink or Uplink.

The extended RRC RECONFIGURATION message can comprise the following data i) to iii):

i)
cellID_1 Capacity Value 1
cellID_2 Capacity Value 2
. . .
cellID_N Capacity Value N;
with N being the total number of cells reported to the serving gNB 100 in the message "MEASUREMENT REPORT" and cellID_i corresponding to the identifier of the cell i and Capacity Value i corresponding to the value of Capacity Value reported in the message "RESOURCE STATUS UPDATE" for the Cell i to the Serving gNB 100. Having in mind that those values of a cell i are related the respective neighboring gNBs 105, 110. Hence, cellID_i could be replaced with gNB_i in all cases ranging from i) to iii).

The capacity values for the Downlink and Uplink can be weighted according to their respective traffic distribution and combined to one single Capacity Value, as done above.

ii)
cellID_1 Load Value 1
cellID_2 Load Value 2
. . .
cellID_N Load Value N;
with N being the total number of cells reported to the serving gNB 100 in the message "MEASUREMENT REPORT" and cellID_i corresponding to the identifier of the cell i and Load Value i being calculated as 100 minus Capacity Value I, wherein the Capacity Value i corresponds to the value of Capacity Value reported in the message RESOURCE STATUS UPDATE for the Cell i to the Serving gNB 100.

iii)
cellID_1 Priority Value 1
cellID_2 Priority Value 2
. . .
cellID_N Priority Value N;
with N being the total number of cells reported to the serving gNB 100 in the message "MEASUREMENT REPORT" and cellID_i corresponding to the identifier of the cell i and Priority Value i being a value that indicates which cell i shall be prioritized in the Load balancing procedure.

In many cases, it is desired by a network operator not to signal the actual capacity or load values of its gNBs around as this information can be valid for hackers that plan to attack the network or for other competitors in that field who can use this information to plan their own network accordingly. In this case it is beneficial to signal only "abstract" priority values per cellID_i as shown in the table above. In other words, the priority values encrypt the actual capacity or load values. Priority Value i corresponds to Capacity Value i/Load Value i compared against an internally set threshold value. For example, if Threshold i<Load Value i<Threshold i+1, then the Priority Value i is assigned to cell ID i. Apart from preventing the network to directly signal capacity or load values, the described signaling of priorities has also yet another advantage: signaled priorities can steer the network traffic very efficiently. In practice, it is clear which gNB will be selected by a UE 120 if the respective capacity or load values lie too close together. The Priority Value i is a possible means to "separate" too very similar values into two different priority categories that can influence the decision of the UE 120.

Based on the estimations of TLC and TCell a network entity, in particular the serving gNB 100, can decide whether to transmit ordinary legacy RRC Reconfiguration message or to use distributed load control (i.e. to transmit some additional information to the terminal in the RRC Reconfiguration message instead) to prevent that RL Failure 140 occurs. If TLC<TCell, the estimated remaining time of the mobile within the radio coverage area of serving gNB 100 cell is (much) larger than delay estimate for "Global Xn Procedure Mobility Settings Change" and legacy RRC Reconfiguration message can be used. If TLC>=TCell, the estimated remaining time of the mobile within the radio coverage area of serving gNB 100 cell is (much) smaller than delay estimate for "Global Xn Procedure Mobility Settings Change" and some additional information will be transmitted to the terminal in the RRC Reconfiguration message. An algorithm implemented on the UE 120 can distinguish the two cases based on the content of the "RRC RECONFIGURATION" message from the serving gNB 100: if capacity or load values or priority values are signaled per CellID, the network has decided to use distributed load control and the UE 120 acts accordingly.

Figure 16:
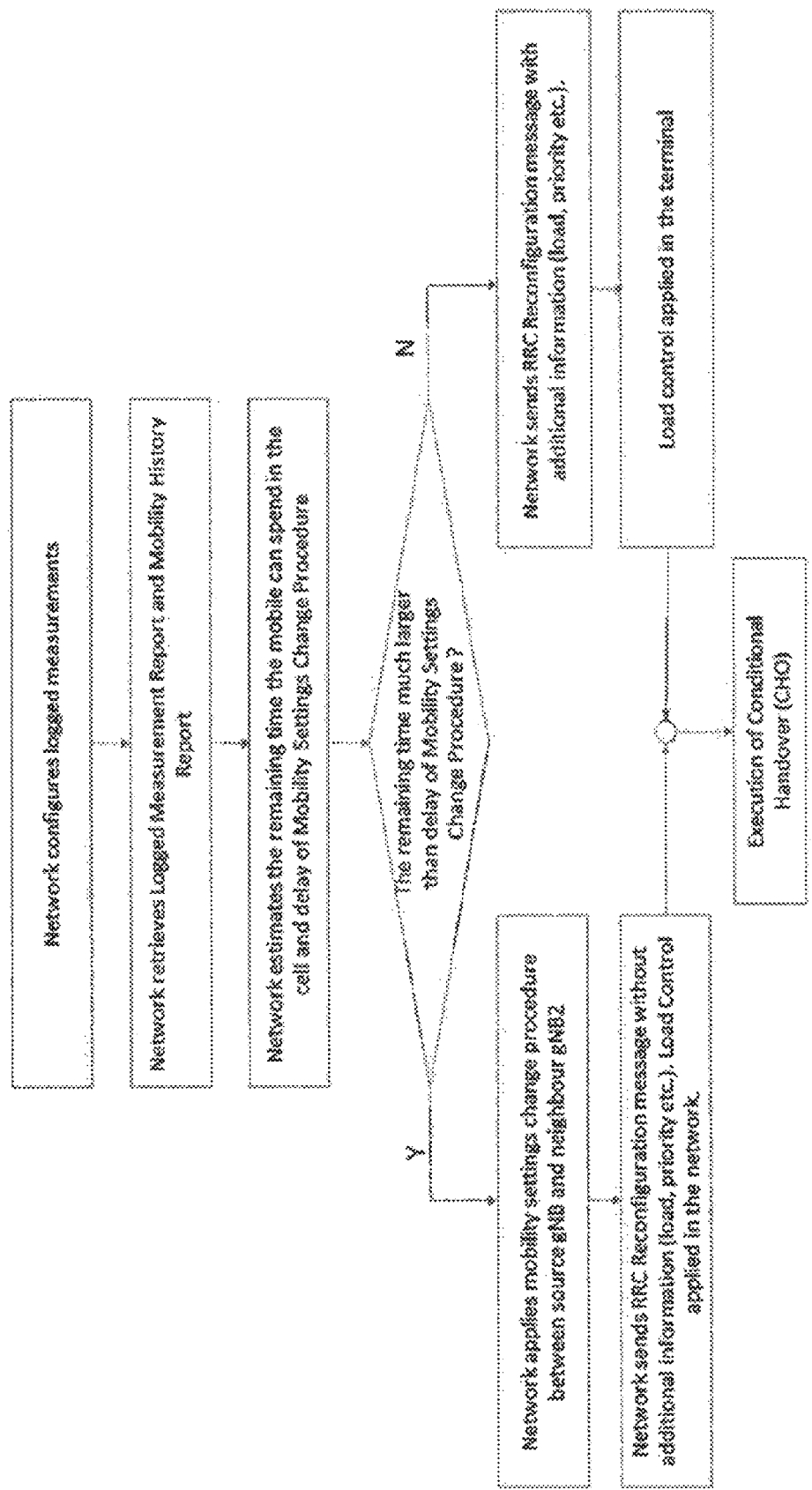
FIG. 16: shows a flow diagram of a method according to the invention.

A flow diagram of the inventive method is shown in FIG. 16.

In step 200 the network entity configures logged measurements. In step 205 the network entity retrieves a logged measurement report and mobility history report. In step 210 the network entity estimates the remaining time the mobile can spend in the cell of the serving gNB 100 and the time delay if the "Mobility Settings Change Procedure" would be performed. Then the algorithm enters a decision in step 215, in step 215 it is evaluated if the remaining time of the mobile within the cell is larger than the delay that is caused by the "Mobility Settings Change Procedure".

If TLC>=TCell (step 220) algorithm enters step 225 and the network entity sends the RRC Reconfiguration message to the user equipment 120, wherein the RRC Reconfiguration message can comprise additional information like load values, priority values, wherein these values are already stored inside network entity so that the time delay to retrieve this information is minimal. In step 230, the UE 120 can randomly connect to any of the candidate gNBs 105, 110 or the UE 120 can apply load control based on the additional information by itself, wherein the load control procedure inside the UE 120 determines to which candidate gNBs 105, 110 the UE 120 tries to connect first. Finally, in step 235 execution of conditional handover (CHO) is applied.

If TLC<TCell (step 240) algorithm enters step 245. In step 245 the network entity applies "mobility settings change procedure" between the serving gNB 100 and the neighboring gNBs 105, 110. In step 250, the network entity sends the appropriate RRC configuration message, which is extended with the information gained from the "mobility settings change procedure", to the UE 120. In this case, the load control is applied by the network entity. Or in other words, the network entity instructs the UE 120 to which neighboring gNB 105, 110 it shall connect next. Finally, the algorithm enters in the second path also in step 235 in which execution of conditional handover (CHO) is applied.

Figure 17:
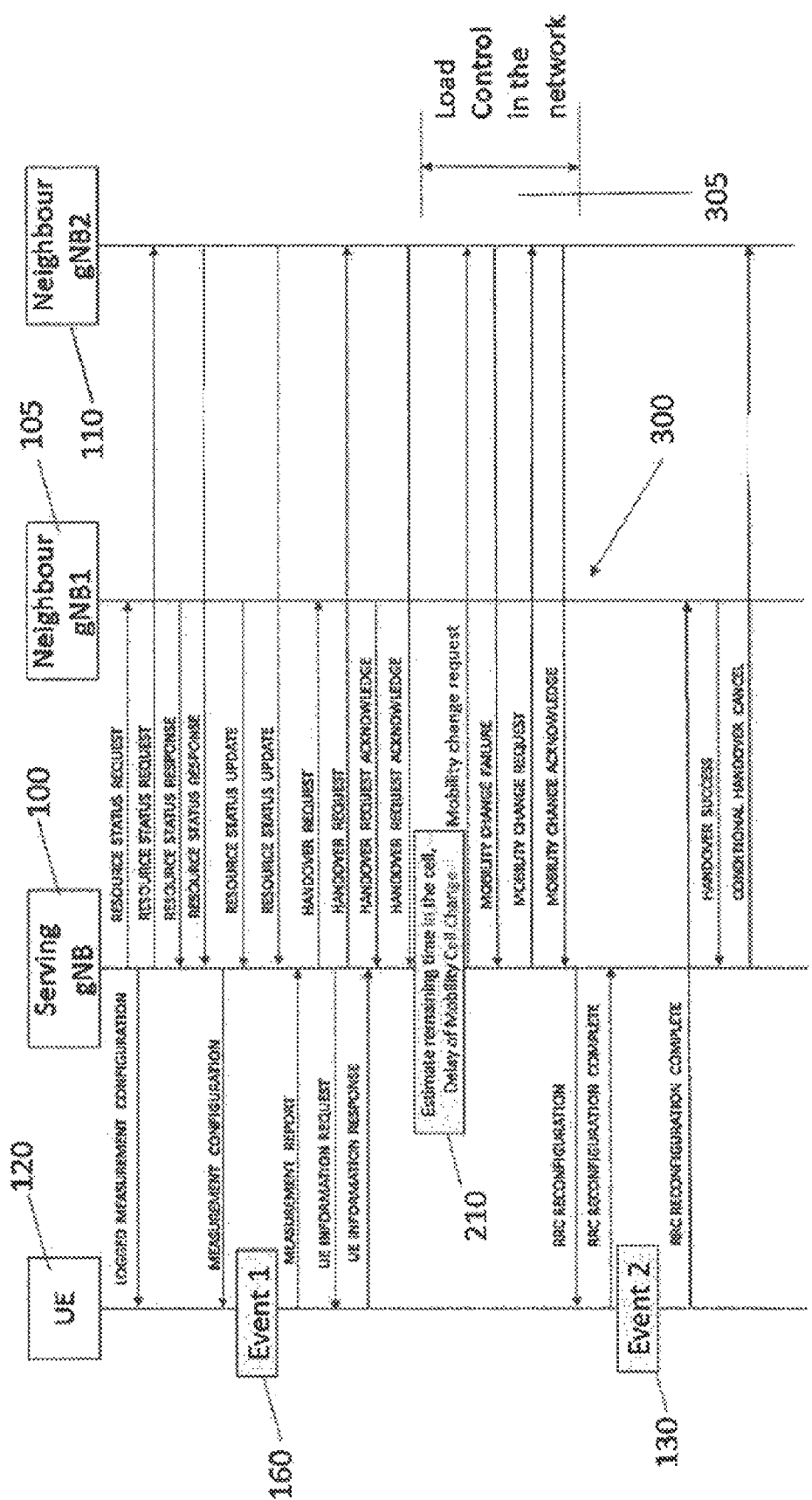
FIG. 17: shows the participating entities of the network and the correspondent data flows if TLC<TCell.

FIG. 17 shows the participating entities of the network and the correspondent signaling flows if TLC<TCell. FIG. 17 shows the step 210 in which the network entity estimates the remaining time of the UE 120 within the cell radio coverage of the serving gNB 100 as well as delay of "mobility change procedure". As FIG. 17 shows the case of TLC<TCell., the "mobility change request procedure" 300 is triggered within the network so that load control is applied in the network 305. After the "mobility change request procedure" 300 has been finished, the resulting "RRC configuration message" with measurement offsets is sent to the UE 120, wherein the "RRC configuration message" instructs the UE 120 to which neighboring gNB 105, 110 it shall connect next in the following conditional handover (CHO) process.

Figure 18:
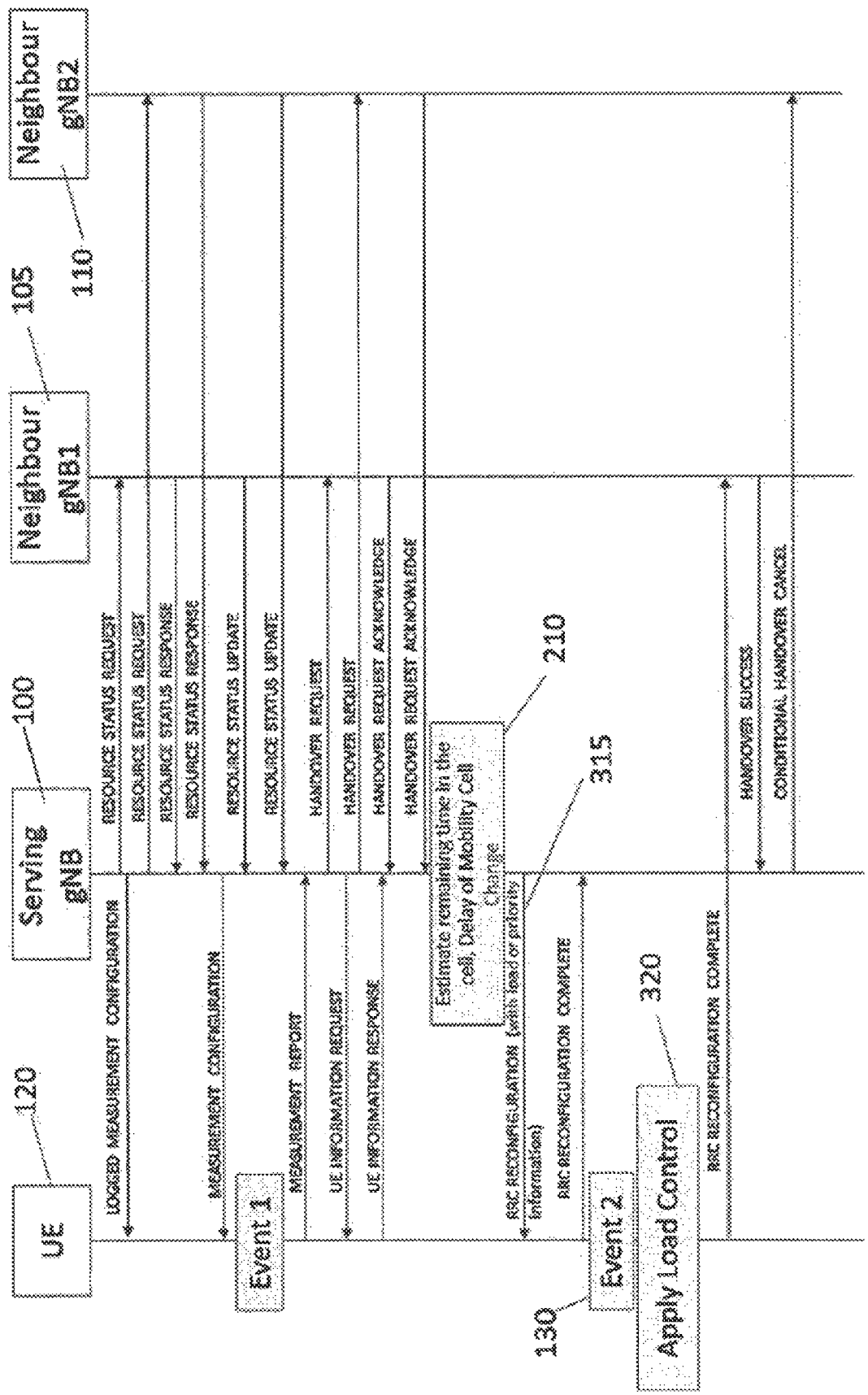
FIG. 18: shows the participating entities of the network and the correspondent data flows if TLC>TCell.

FIG. 18 shows the participating entities of the network and the correspondent data flows if TLC>=TCell. FIG. 18 shows the step 210 in which the network entity estimates the remaining time of the UE 120 within the cell radio coverage of the serving gNB 100 as well as delay of "mobility change procedure". As FIG. 18 shows the case of TLC>TCell., the network entity, in particular the serving gNB 100, sends the RRC configuration message 315 with priority, load or capacity information as soon as possible to the UE 120. After "event 2" 130 has occurred, load control 320 is being applied by the UE 120.

Possible Implementation of the Procedure According FIG. 16 to 18 within the UE 120:

In the ideal case, the UE 120 selects the same neighboring gNB 105, 110 as in the case if load control would be applied by the network entity.

If the load control is fully implemented on network side (not distributed), the network entity can prioritize the cells by applying corresponding measurement offsets on the measurements of specific cells. The offsets essentially prohibit the cells from achieving the triggering criterion simultaneously and deprioritizes the cell with the largest negative or the smallest positive offset. The offset should be set so that a cell with the lower load achieves the radio triggering criterion for CHO before a cell with higher load. By radio triggering criterion for CHO (Event 2), a fulfilment of triggering event A3 or A5 (as defined in reference [5]) is meant.

If the load control is distributed, there are no configured offsets to prevent the cells from fulfilling the radio triggering criterion for CHO simultaneously as the "Global Xn Procedure Mobility Settings Change" could not be applied between the serving gNB 100 and corresponding neighboring gNBs 105, 110. Hence the UE 120 might request the candidate cells fulfilling the radio part of triggering criterion simultaneously according to decreasing values of signaled Capacity Values (if these are signaled in RRC RECONFIGURATION) or according to increasing values of signaled Load Values (if these are signaled in RRC RECONFIGURATION) and to execute handover to the first cell on the list of the cells listed in this way. Alternatively, the terminal could request the cells fulfilling the radio part of triggering criterion simultaneously according to increasing Priority Values (if these are signaled) and execute handover to the first cell on the list of the cells ordered in this way.

Figure 19:
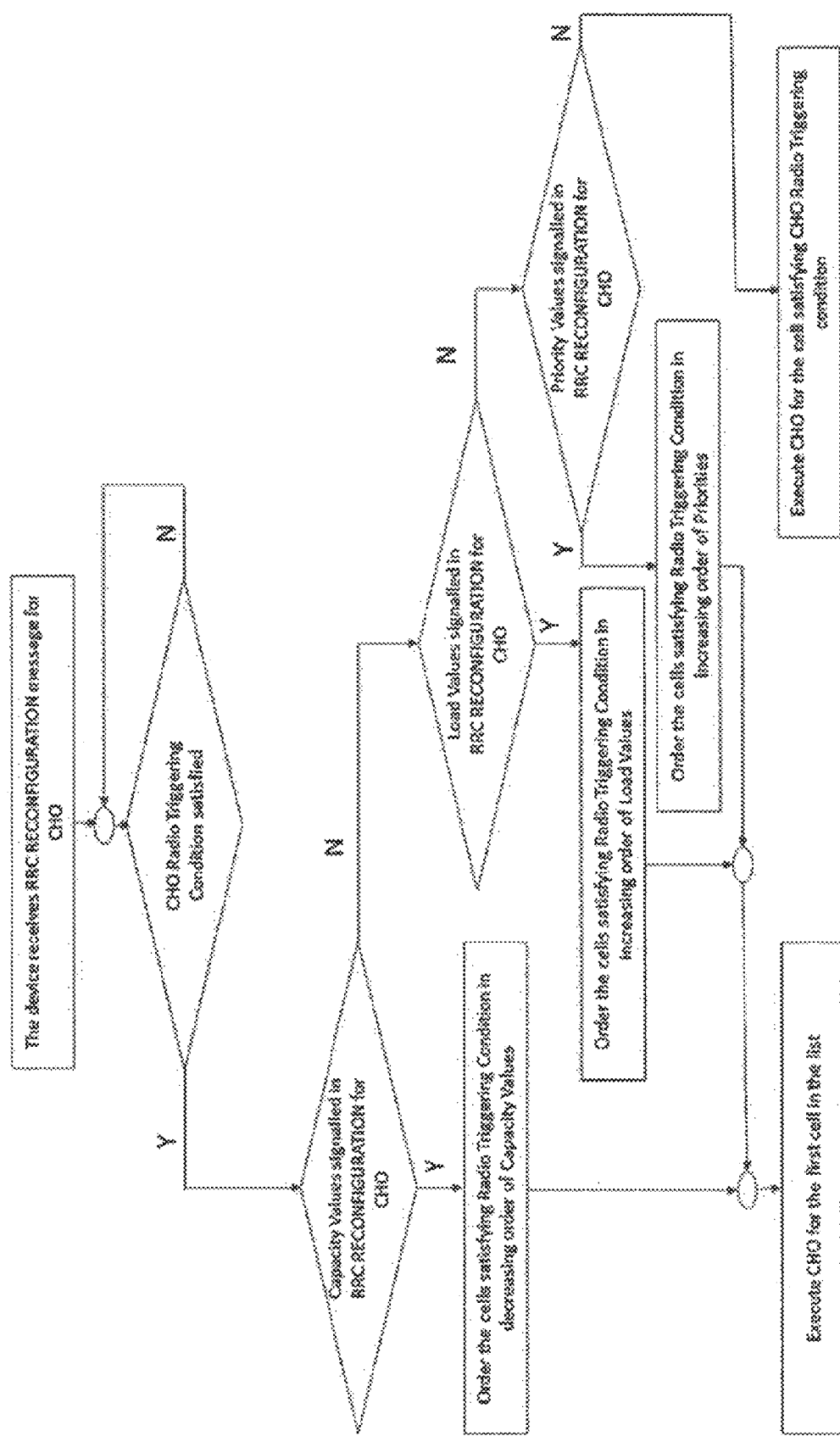
FIG. 19: shows the flow diagram of the decision process of the UE.

FIG. 19 shows the flow diagram of the decision process of the UE 120.

In step 400, the UE 120 receives is the "RRC Reconfiguration message" for CHO.

The algorithm then enters a decision loop 410, wherein the UE 120 frequently checks if a CHO radio triggering condition is satisfied. Step 415 shows that if the answer is no, then the whole process of checking the radio triggering condition is repeated. Step 420 shows that if the radio triggering condition is satisfied, the algorithm enters a decision 425 in which it is checked if capacity values were signaled in the RRC Reconfiguration message. If yes, the algorithm enters step 430 in which the UE 120 requests a communication establishment with the cells satisfying the radio triggering condition in a decreasing order of capacity values. The algorithm then finally enters step 435 in which the CHO process is executed for the first cell in the list.

If the answer of the decision 425 is no, then the algorithm enters a further decision 440 in which it is checked if load values were signaled in the RRC Reconfiguration message. If yes, the algorithm enters step 445 in which the UE 120 requests a communication establishment with the cells satisfying the radio triggering condition in an increasing order of load values. The algorithm then finally enters step 435 in which the CHO process is executed for the first cell in the list.

If the answer of the decision 440 is no, then the algorithm enters still a further decision 450 in which it is checked if priority values were signaled in the RRC Reconfiguration message. If yes, the algorithm enters step 455 in which the UE 120 requests a communication establishment with the cells satisfying the radio triggering condition in an increasing order of priority values. The algorithm then finally enters step 435 in which the CHO process is executed for the first cell in the list.

If the answer of the decision 450 is no, then the algorithm finally executes in step 460 the CHO procedure for all or an arbitrarily chosen cell/gNB 105, 110 satisfying the CHO radio triggering condition Variants of the Solution: Transmission of SON Information in the Measurement Report:

As explained before, the network entity can obtain the Mobility History SON Report or Logged Measurement SON Report by using the UE Information Request/Response procedure. According to the current specification, in the information obtained by using this procedure there are a lot of Information Elements, which are actually not needed for the network to conduct an estimate. To realize that there are a lot of IE not needed for the network to conduct the estimate, current coding of the "UE INFORMATION REQUEST" message and "INFORMATION RESPONSE" message according to reference [5] is given below.

```
-- ASN1START
-- TAG-UEINFORMATIONREQUEST-START
UEInformationRequest-r16 ::=          SEQUENCE {
    rrc-TransactionIdentifier             RRC-TransactionIdentifier,
    criticalExtensions                    CHOICE {
        ueInformationRequest-r16              UEInformationRequest-r16-IEs,
        criticalExtensionsFuture              SEQUENCE { }
    }
}
UEInformationRequest-r16-IEs ::=      SEQUENCE {
    idleModeMeasurementReq-r16            ENUMERATED{true}
OPTIONAL, -- Need N
    logMeasReportReq-r16                  ENUMERATED {true}
OPTIONAL, -- Need N
    connEstFailReportReq-r16              ENUMERATED {true}
OPTIONAL, -- Need N
    ra-ReportReq-r16                      ENUMERATED {true}
OPTIONAL, -- Need N
    rlf-ReportReq-r16                     ENUMERATED {true}
OPTIONAL, -- Need N
    mobilityHistoryReportReq-r16          ENUMERATED {true}
OPTIONAL, -- Need N
    lateNonCriticalExtension              OCTET STRING
OPTIONAL,
    nonCriticalExtension                  SEQUENCE { }
OPTIONAL
}
-- TAG-UEINFORMATIONREQUEST-STOP
-- ASN1STOP
-- ASN1START
-- TAG-UEINFORMATIONRESPONSE-START
UEInformationResponse-r16 ::=         SEQUENCE {
    rrc-TransactionIdentifier             RRC-TransactionIdentifier,
    criticalExtensions                    CHOICE {
        ueInformationResponse-r16             UEInformationResponse-r16-IEs,
        criticalExtensionsFuture              SEQUENCE { }
    }
}
UEInformationResponse-r16-IEs ::=     SEQUENCE {
    measResultIdleEUTRA-r16               MeasResultIdleEUTRA-r16
OPTIONAL,
    measResultIdleNR-r16                  MeasResultIdleNR-r16
OPTIONAL,
    logMeasReport-r16                     LogMeasReport-r16
OPTIONAL,
    connEstFailReport-r16                 ConnEstFailReport-r16
OPTIONAL,
    ra-ReportList-r16                     RA-ReportList-r16
OPTIONAL,
    rlf-Report-r16                        RLF-Report-r16
OPTIONAL,
    mobilityHistoryReport-r16             MobilityHistoryReport-r16
OPTIONAL,
    lateNonCriticalExtension              OCTET STRING
```

```
OPTIONAL,
    nonCriticalExtension                SEQUENCE { }
OPTIONAL
}
LogMeasReport-r16 ::=                   SEQUENCE {
    absoluteTimeStamp-r16                   AbsoluteTimeInfo-r16,
    traceReference-r16                      TraceReference-r16,
    traceRecordingSessionRef-r16            OCTET STRING (SIZE (2)),
    tce-Id-r16                              OCTET STRING (SIZE (1)) ,
    logMeasInfoList-r16                     LogMeasInfoList-r16,
    logMeasAvailable-r16                    ENUMERATED {true}
OPTIONAL,
    logMeasAvailableBT-r16                  ENUMERATED {true}
OPTIONAL,
    logMeasAvailableWLAN-r16                ENUMERATED {true}
OPTIONAL,
    ...
}
LogMeasInfoList-r16 ::=                 SEQUENCE (SIZE
(1..maxLogMeasReport-r16)) OF LogMeasInfo-r16
LogMeasInfo-r16 ::=                     SEQUENCE {
    locationInfo-r16                        LocationInfo-r16
OPTIONAL,
    relativeTimeStamp-r16                   INTEGER (0..7200),
    servCellIdentity-r16                    CGI-Info-Logging-r16
OPTIONAL,
    measResultServingCell-r16               MeasResultServingCell-r16
OPTIONAL,
    measResultNeighCells-r16                SEQUENCE {
        measResultNeighCellListNR               MeasResultListLogging2NR-
r16     OPTIONAL,
        measResultNeighCellListEUTRA            MeasResultList2EUTRA-r16
OPTIONAL
    },
    anyCellSelectionDetected-r16            ENUMERATED {true}
OPTIONAL
}
```

Figure 20:
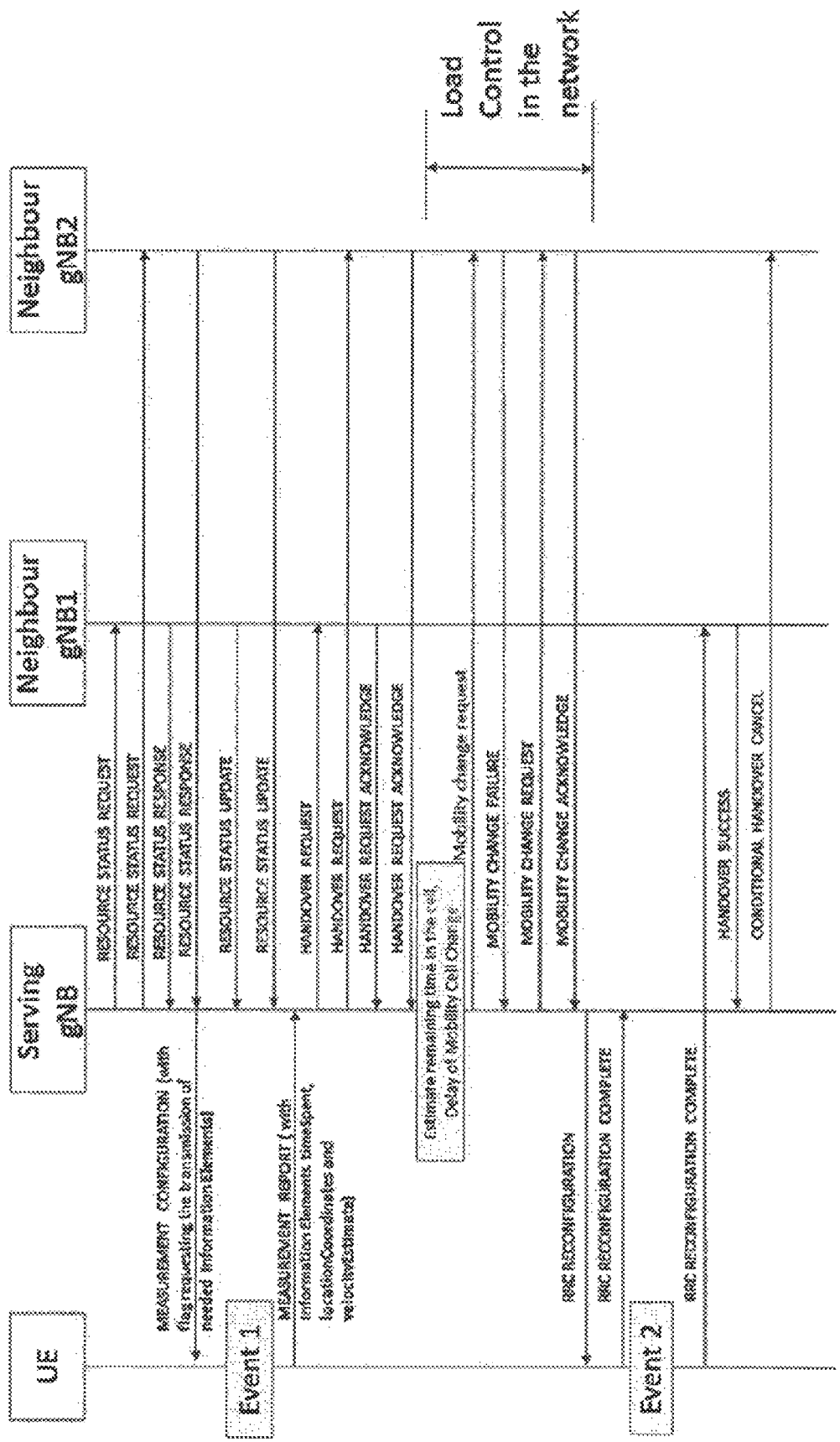
FIG. 20: shows an embodiment in which the network entity demands only reduced information from the UE.
Figure 21:
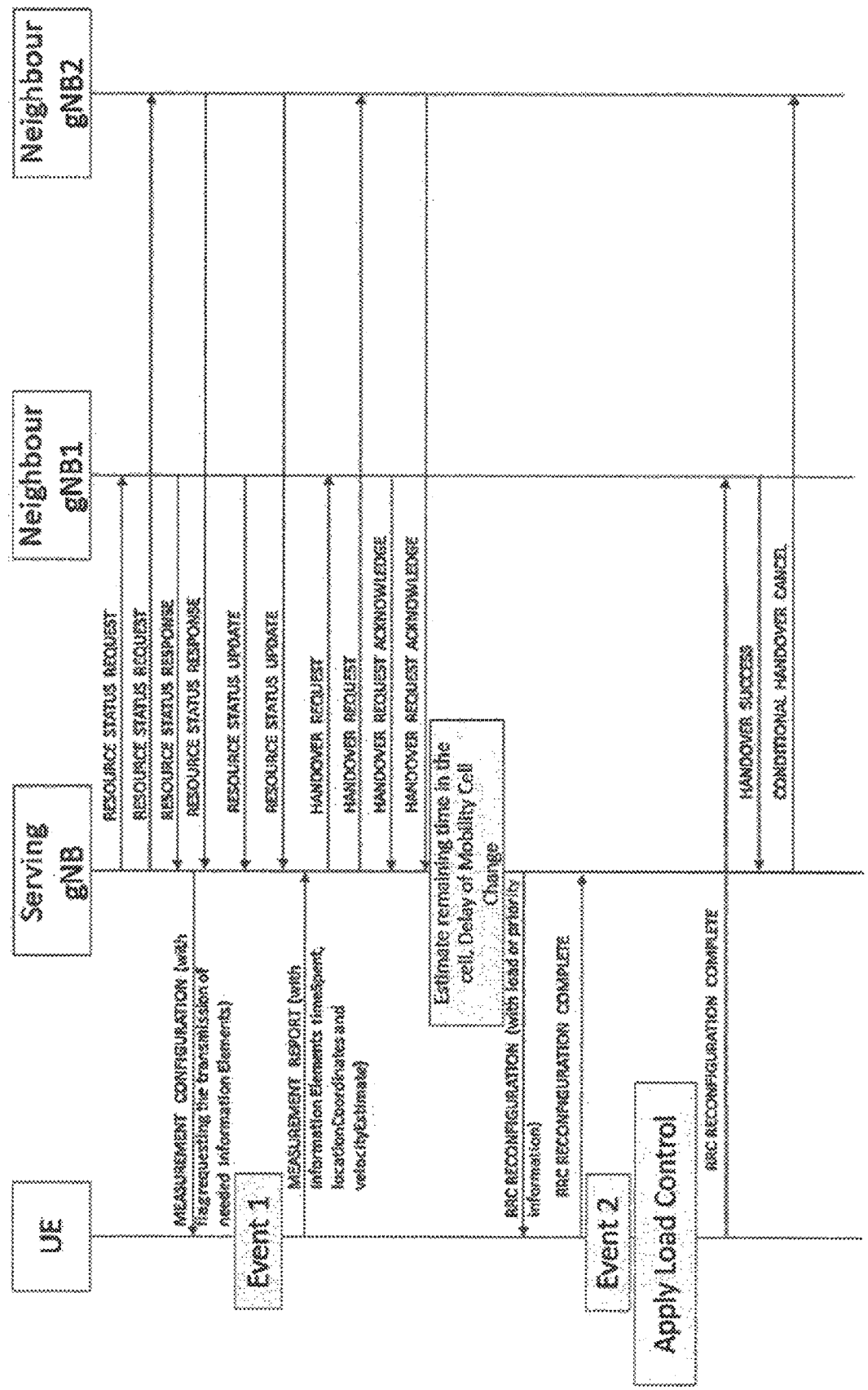
FIG. 21: shows a further embodiment in which the network entity demands only reduced information from the UE.
Figure 22:
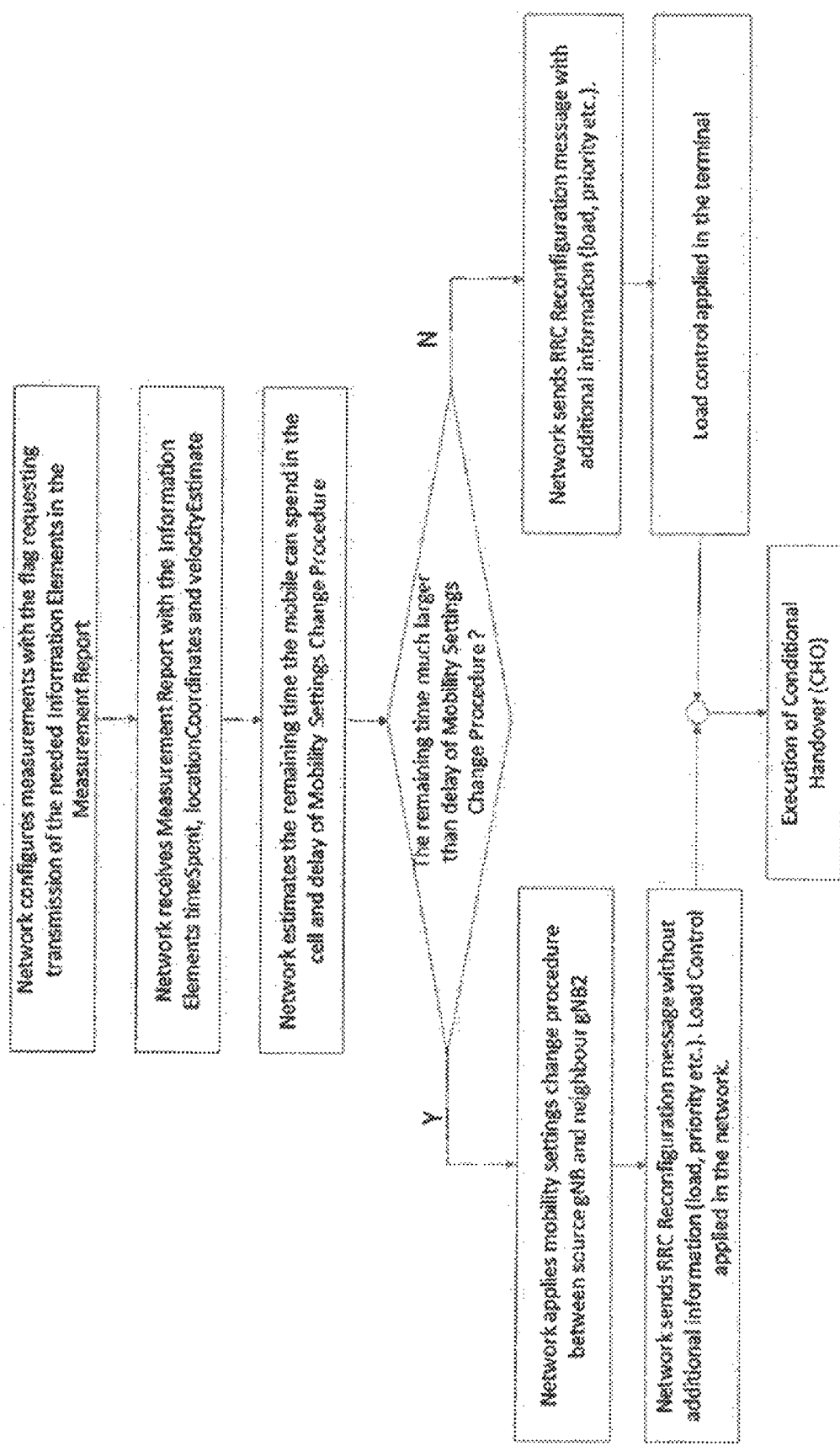
FIG. 22: shows a flow diagram according to FIG. 21.

In order to decrease the signaling load on the uplink in order to avoid invoking UE Information Request/Response procedure each time, the network entity can decide on conducting load control for CHO that a flag may be introduced in the "Measurement Configuration" message to request only the transmission of Information Elements timeSpent, locationCoordinate and velocityEstimate. In this context, FIG. 20 shows the case in which the estimated remaining time the mobile can spend in the cell is much larger than delay estimate for "Global Xn Procedure Mobility Settings Change". FIG. 21 shows the case in which the estimated remaining time the mobile can spend in the cell is much shorter than delay estimate for "Global Xn Procedure Mobility Settings Change". FIG. 22 shows the flow diagram of network operation in this case.

UE Capability for Distributed Load Control:

As a result, the network will not be populated exclusively by UEs 120, which are capable for distributed load control from the very beginning. Most likely, there will be a large share of UEs 120 that are not supporting distributed load control so that the network cannot apply the described solution on such terminals. In order to avoid potential conflicts between network signaling and actual abilities of the UEs, it is suggested that the terminal signals its capability on distributed load control to the network. The network normally retrieves terminal capability when the connection is set up for the first time and hence knows beforehand whether the described solution can be applied in the particular case.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

THE CONTENTS OF THE FOLLOWING
REFERENCES ARE HEREBY EXPLICITLY
INCORPORATED INTO THE TEXT

[1] TS 38.401 V.g.4.0 "NG-RAN Architecture Description (Release 16)"
[2] TS 23.501 V.g.0.2 "System Architecture for 5G System; Stage II (Release 16)"
[3]
[4] "LTE Self-Organizing Networks (SON)", S. Hämäläinen, H. Sanneck, C. Sartori (Wiley 2012)
[5] TS 38.331 V.g.2.0 "Radio Resource Control (RRC); Protocol Specification"
[6] TS 38.423 V.g.3.0 "NG-RAN; Xn Application Protocol (XnAP)"

The invention claimed is:

1. A method for steering communication traffic of a user equipment (UE), in a wireless communication network,
wherein the wireless communication network comprises at least some base stations that are configured to provide a radio access network (RAN) for the UE, including a serving base station that provides current access to the wireless communication network for the UE,
wherein each of the base stations is configured to communicate at least with its neighboring base stations, and
wherein the method comprises:
using, by a base station of the at least some base stations, as a first input a first time duration $T_{Cell}$, wherein $T_{Cell}$ estimates a time duration that the UE is within a radio coverage area of the serving base station;
using, by the base station, as a second input a second time duration $T_{LC}$, wherein $T_{LC}$ estimates a time duration it takes the wireless communication network to determine an adjusted load control setting for the UE;
comparing, by the base station, $T_{Cell}$ against $T_{LC}$; and
when $T_{Cell} > T_{LC}$:
applying, by the base station, load control procedures within the wireless communication network;
adding, by the base station, a network-calculated load control information to a Radio Resource Control message; and
transmitting, by the base station, the Radio Resource Control message with the network-calculated load control information to the UE; or
when $T_{Cell} < T_{LC}$:
transmitting, by the base station, the Radio Resource Control message without the network-calculated load control information to the UE.

2. The method of claim 1, wherein when $T_{Cell} < T_{LC}$, the Radio Resource Control message is provided with network-mapped based load control information for the UE.

3. The method according to claim 1, wherein the base station of the at least some base stations is the serving base station.

4. The method according to claim 3, wherein the serving base station requests the status information from the UE.

5. The method according to claim 1, wherein $T_{Cell}$ is estimated based on status information of the UE.

6. The method according to claim 1, wherein $T_{LC}$ is estimated based on a status information exchange between the serving base station and its neighboring base stations.

7. The method according to claim 6, wherein the serving base station requests the respective status information of its neighboring base stations.

8. The method according to claim 1, wherein the network-calculated load control pieces of information and/or the network-mapped load control pieces of information are selected to be offset values, capacity values, load values or priority values characterizing each neighboring base station.

9. The method according to claim 1, wherein the comparison is performed by using $T^{\#}_{LC}$ instead of $T_{LC}$, with $T^{\#}_{LC} = T_{LC} + T_{safety}$, wherein $T_{safety}$ is a safety time interval.

10. The method of claim 9, wherein $T_{safety}$ is adapted dynamically according to a previous success rate.

11. The method according to claim 1, wherein the UE starts a Conditional Handover (CHO) process to connect to another base station based on the Radio Resource Control message when the UE detects a CHO condition.

12. The method according to claim 1, wherein the network-calculated and/or network-mapped load control information depends on a current application running on the UE.

13. A wireless communication system comprising:
a wireless communication network;
a user equipment (UE) configured to connect to the wireless communication network and to exchange data with the wireless communication network;
at least some base stations configured to provide a radio access network (RAN) for the user equipment, including a serving base station configured to provide current access to the wireless communication network for the UE;
a wireless and/or wired communication link between the serving base station and its neighboring base stations; and
wherein a base station of the at least some base stations is configured to:
use as a first input a first time duration $T_{Cell}$, wherein $T_{Cell}$ estimates a time duration that the UE is within a radio coverage area of the serving base station;
use as a second input a second time duration $T_{LC}$, wherein $T_{LC}$ estimates a time duration it takes the wireless communication network to determine an adjusted load control setting for the UE;
compare $T_{Cell}$ against $T_{LC}$; and
when $T_{Cell} > T_{LC}$:
apply, by the base station, load control procedures within the wireless communication network;
add a network-calculated load control information to a Radio Resource Control message; and
transmit the Radio Resource Control message with the network-calculated load control information to the UE; or
when $T_{Cell} < T_{LC}$:
transmit the Radio Resource Control message without the network-calculated load control information to the UE.

14. A base station, wherein the base station comprises:
a first communication interface to provide a radio access network (RAN) for a user equipment (UE);
a second communication interface to communicate in a wired or wireless fashion with further network entities; and
a processor configured to:
use as a first input a first time duration $T_{Cell}$, wherein $T_{Cell}$ estimates a time duration that the UE is within a radio coverage area of a serving base station;
use as a second input a second time duration $T_{LC}$, wherein $T_{LC}$ estimates a time duration it takes the wireless communication network to determine an adjusted load control setting for the UE;
compare $T_{Cell}$ against $T_{LC}$; and
when $T_{Cell} > T_{LC}$:

apply, by the base station, load control procedures within the wireless communication network;

add a network-calculated load control information to a Radio Resource Control message; and transmit the Radio Resource Control message with the network-calculated load control information to the UE; or when $T_{Cell} < T_{LC}$:

transmit the Radio Resource Control message without the network-calculated load control information to the UE.

\* \* \* \* \*